US011045729B2

(12) United States Patent
Yoshida et al.

(10) Patent No.: US 11,045,729 B2
(45) Date of Patent: Jun. 29, 2021

(54) GAME PROCESSING PROGRAM AND GAME SYSTEM

(71) Applicant: SQUARE ENIX CO., LTD., Tokyo (JP)

(72) Inventors: Naoki Yoshida, Tokyo (JP); Masaki Nakagawa, Tokyo (JP)

(73) Assignee: SQUARE ENIX CO., LTD., Tokyo (JP)

(*) Notice: Subject to any disclaimer, the term of this patent is extended or adjusted under 35 U.S.C. 154(b) by 0 days.

(21) Appl. No.: 16/703,129

(22) Filed: Dec. 4, 2019

(65) Prior Publication Data

US 2020/0206611 A1 Jul. 2, 2020

(30) Foreign Application Priority Data

Dec. 28, 2018 (JP) .............................. JP2018-247422

(51) Int. Cl.
*A63F 13/352* (2014.01)
*A63F 13/822* (2014.01)
*A63F 13/40* (2014.01)

(52) U.S. Cl.
CPC ............ *A63F 13/352* (2014.09); *A63F 13/40* (2014.09); *A63F 13/822* (2014.09);
(Continued)

(58) Field of Classification Search
CPC ........ A63F 13/47; A63F 13/58; A63F 13/822; A63F 13/833; A63F 2300/609; A63F 2300/632; A63F 2300/807
See application file for complete search history.

(56) References Cited

U.S. PATENT DOCUMENTS 6,267,673 B1 * 7/2001 Miyamoto .............. A63F 13/06
463/31
2003/0040347 A1 * 2/2003 Roach ..................... A63F 13/92
463/1
(Continued)

FOREIGN PATENT DOCUMENTS

JP 2015-163262 9/2015
JP 2016-131818 7/2016

OTHER PUBLICATIONS

"Black Desert Online," released May 24, 2017 by developer Pearl Abyss. Source: https://store.steampowered.com/app/582660/Black_Desert_Online/ (Year: 2017).*
(Continued)

*Primary Examiner* — Steven J Hylinski
(74) *Attorney, Agent, or Firm* — Greenblum & Bernstein, P.L.C.

(57) ABSTRACT

A game processing program causes a server apparatus to control progress of a video game. The server apparatus is connected through a communication network to a terminal apparatus that executes the video game in which one or more users participate. The program causes the server apparatus to implement a progress control function of controlling progress of the plurality of game contents including a first content and a second content, an object control function of controlling motion of a player object of each user in game spaces of the game contents, an arrangement function of arranging determination areas at a plurality of arrangement positions in a game space of the first content during a first predetermined period, and a permission function of permitting users of player objects moved to the determination areas to play the second content until the number of permissions reaches a first defined number.

11 Claims, 15 Drawing Sheets

(52) U.S. Cl.
CPC ..... *A63F 2300/636* (2013.01); *A63F 2300/64* (2013.01); *A63F 2300/807* (2013.01)

(56) References Cited

U.S. PATENT DOCUMENTS

| | | | | |
|---|---|---|---|---|
| 2009/0286598 A1* | 11/2009 | Do | ................... | A63F 13/57 463/31 |
| 2012/0011256 A1* | 1/2012 | Masuda | ............... | H04L 67/38 709/227 |

OTHER PUBLICATIONS

"Historia Ruins, Huge Underground Ruins on the East Side of the Valence Desert (Black Desert)," by Yakamochi. Published Apr. 30, 2016. Source: https://chimolog.co/black-desert-historia-ruins/ (Year: 2016).*

"Desert Portals to Hystria Ruins and Aakman Temple," by Telespapeles. Published Aug. 27, 2017. Source: forum.gameznetwork.com/threads/desert-portals-to-hystria-ruins-and-aakman-temple.207351/ (Year: 2017).*

English Machine Translation of the Description of JP2016131818A by Shimai Hiroyuki provided by the EPO. (Year: 2016).*

Japanese Office Action dated Jan. 28, 2020 issued in Japanese Patent Application No. 2018-247422, with an English translation.

Historia Ruins, vast underground remains spreading in the east side of the Valencia Desert dated Apr. 30, 2016 (https://chimolog.co/black-desert-historia-ruins/) with a partial English translation.

What is the "Solma Underground Ruins"? dated Apr. 26, 2018 (http://icarus.gamecom.jp/hangame/notice/view.php?boardSeq=12 &seq=221) with a partial English translation.

* cited by examiner

FIG.13A

PARTICIPATING USER LIST

| MANAGEMENT NUMBER | PARTICIPATING USER |
|---|---|
| 1 | USER DATA |
| 2 | USER DATA |
| 3 | USER DATA |
| 4 | USER DATA |
| 5 | USER DATA |
| 6 | USER DATA |

USER DATA

| USER ID | CHARACTER STATUS | | | | | POSSESSED ITEM | ... |
| | CHARAC-TER ID | NAME | PARA-METER | COORDINATE | ... | | |
|---|---|---|---|---|---|---|---|
| J01-0001 | MX001 | KEN | * | (,,) | ... | *,*, AI-A01B01, AI-A01FFF,... | ... |

FIG.14

FIRST ARRANGEMENT LIST

| MANAGEMENT NUMBER | COORDINATE | PERMISSION RECORD |
|---|---|---|
| 1 | (,,**) | 0 |
| 2 | (,,**) | 1 |
| 3 | (,,**) | 0 |
| 4 | (,,**) | 0 |
| 5 | (,,**) | 0 |
| 6 | (,,**) | 0 |
| 49 | (,,**) | 1 |
| 50 | (,,**) | 0 |

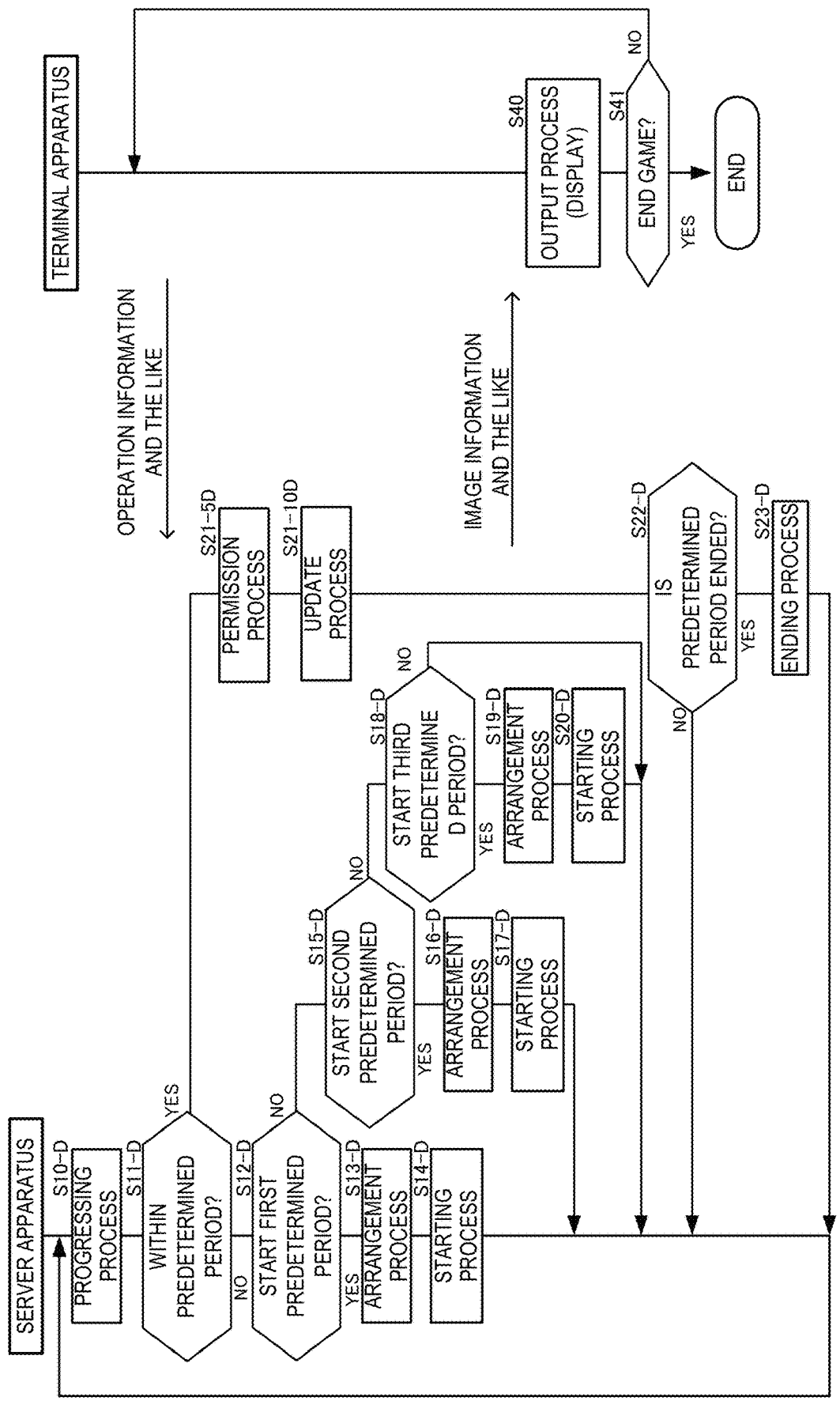

GAME PROCESSING PROGRAM AND GAME SYSTEM

BACKGROUND OF THE INVENTION

1. Field of the Invention

At least one embodiment of the present invention relates to a game processing program and a game system.

2. Description of Related Art

In recent years, an online game such as a massively multiplayer online role-playing game (MMORPG) has been provided to a game apparatus (terminal apparatus) from a server apparatus through a communication network (for example, refer to JP-A-2015-163262 (JP-2015-99158)).

In the online game, a plurality of game contents are provided. For example, the game contents include a game content in which a task of defeating a predetermined enemy in a game space is set.

Such game contents include a content in which a plurality of users can participate at the same time. For example, a game content in which player characters of the plurality of users defeat a single enemy in a common game space is present. In the game content in which the plurality of users can participate, the maximum number of users who can participate at the same time may be set. For example, in a game content in which maximum 100 persons can participate, participation of users is not accepted anymore in a case where the number of participating users reaches 100.

SUMMARY OF THE INVENTION

In such a game content in which the number of participating users is set, it is a task to appropriately decide users who are permitted to participate.

An object of at least one embodiment of the present invention is to resolve a deficiency of relevant technologies.

From a non-limiting viewpoint, a video game processing program according to the present invention is a game processing program for causing a server apparatus to control progress of a video game. The server apparatus is connected through a communication network to a terminal apparatus that executes the video game including a plurality of game contents in which one or more users participate. The program causes the server apparatus to implement a progress control function of controlling progress of the plurality of game contents including a first content and a second content, an object control function of controlling motion of a player object of each user in game spaces of the game contents, an arrangement function of arranging determination areas at a plurality of arrangement positions in a game space of the first content during a first predetermined period, and a permission function of permitting users of player objects moved to the determination areas to play the second content until the number of permissions reaches a first defined number.

From a non-limiting viewpoint, a video game system according to the present invention is a game system that controls progress of a video game. The system includes a terminal apparatus that executes the video game including a plurality of game contents in which one or more users participate, and a server apparatus that is connected through a communication network to the terminal apparatus. The server apparatus includes a progress controller configured to control progress of the plurality of game contents including a first content and a second content, an object controller configured to control motion of a player object of each user in game spaces of the game contents, an arranger configured to arrange determination areas at a plurality of arrangement positions in a game space of the first content during a first predetermined period, and a permitter configured to permit users of player objects moved to the determination areas to play the second content until the number of permissions reaches a first defined number.

From a non-limiting viewpoint, a video game processing program according to the present invention is a game processing program for causing a computer of a terminal apparatus of a user to implement a function of communicating with a server apparatus having a function of controlling progress of a video game including a plurality of game contents in which one or more users participate. The program causes the terminal apparatus to implement a function of receiving image information from the server apparatus having a progress control function of controlling progress of the plurality of game contents including a first content and a second content, an object control function of controlling motion of a player object of each user in game spaces of the game contents, an arrangement function of arranging determination areas at a plurality of arrangement positions in a game space of the first content during a first predetermined period, a permission function of permitting users of player objects moved to the determination areas to play the second content until the number of permissions reaches a first defined number, and a generation function of generating the image information of the game contents.

One or two or more deficiencies are resolved by each embodiment of the present application.

BRIEF DESCRIPTION OF THE DRAWINGS

FIGS. 13A and 13B are diagrams illustrating one example of a participating user list and user data corresponding to at least one embodiment of the present invention.

FIG. 14 is a diagram illustrating one example of a first arrangement list corresponding to at least one embodiment of the present invention.

FIG. 15 is a flowchart illustrating an example of the first content progressing process corresponding to at least one embodiment of the present invention.

DESCRIPTION OF EMBODIMENTS

Hereinafter, examples of embodiments of the present invention will be described with reference to the drawings. Various constituents in the example of each embodiment described below can be appropriately combined without contradiction and the like. A description of details described as an example of a certain embodiment may not be provided in other embodiments. Details of operations and processes not related to characteristic parts of each embodiment may not be provided. The order of various processes constituting various flows described below may be changed without contradiction and the like in process details.

First Embodiment

Figure 1:
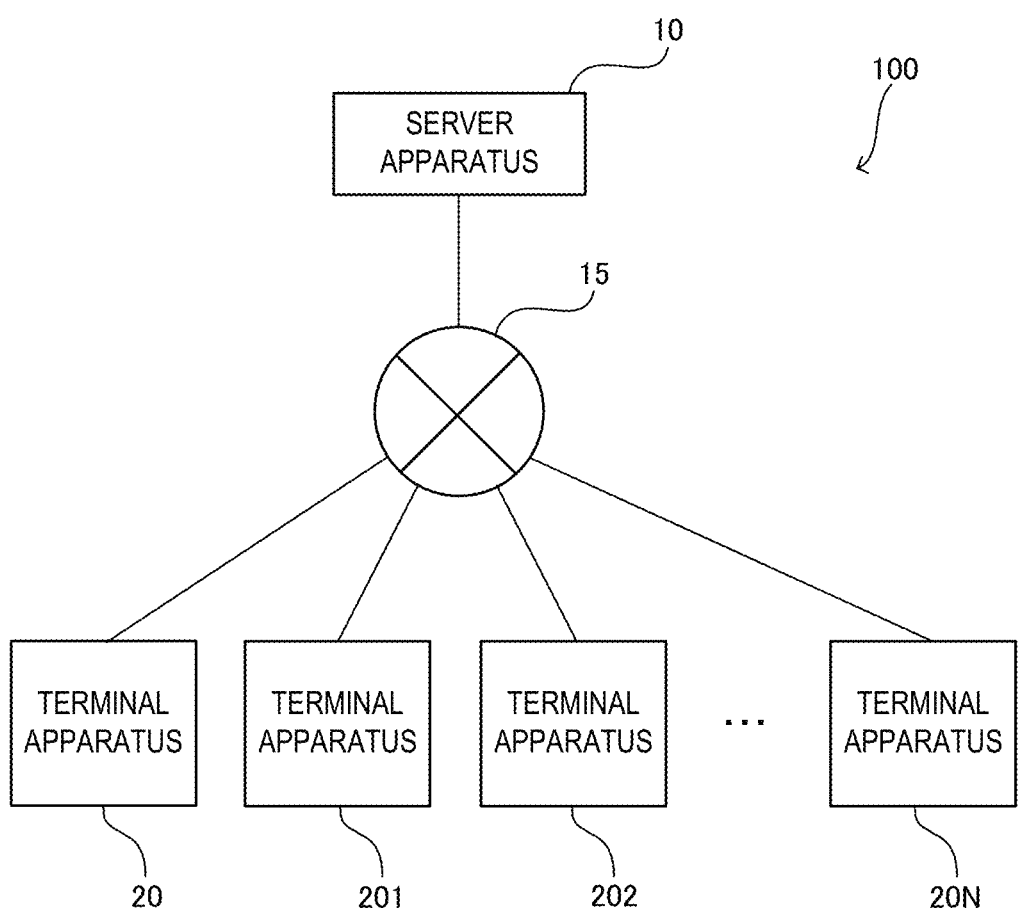
FIG. 1 is a block diagram illustrating an example of a configuration of a game system corresponding to at least one embodiment of the present invention.

FIG. 1 is a block diagram illustrating an example of a configuration of a game system 100 in one embodiment of the present invention. As illustrated in FIG. 1, the game system 100 includes a server apparatus 10 and terminal apparatuses (game apparatuses) 20, 201 to 20N (N is any integer) used by a plurality of users (players) who play a video game (game). The server apparatus 10 and the plurality of terminal apparatuses 20, 201 to 20N are connected to a communication network 15 such as the Internet. The configuration of the game system 100 is not limited to the above configuration. For example, it may be configured that the game system 100 includes a plurality of server apparatuses.

For example, the game system 100 has various functions for executing the video game including a plurality of game contents in which one or more users can participate at the same time. The game of the example of the present embodiment is configured with the plurality of game contents including a first content and a second content. The user causes a player object to perform motions such as flying, running, and attack by operating the player object of the user in a game space of the game content.

In the game of the example of the present embodiment, the user who is playing in the first content is permitted to play the second content. Users are permitted until the number of permitted users (number of permissions) reaches a first defined number. That is, the number of users who can play at the same time is the first defined number in the second content. For example, the first defined number is 50.

A method of deciding the user who is permitted to play is performed using determination areas that are arranged in the game space of the first content. Specifically, during a first predetermined period, the determination areas are arranged at a plurality of arrangement positions in the game space of the first content. The user of the player object that is moved to the determination area before the number of permissions reaches the first defined number is permitted to play the second content. Accordingly, in a case where the number of users participating in the first content is larger than the first defined number, the user needs to find any determination area in the game space and move the player object of the user to the determination area before the number of permissions reaches the first defined number.

For example, the first predetermined period is five minutes. The start timing of the first predetermined period may be any timing in the execution of the first content. For example, the start timing may be a timing at which a predetermined event is generated in the first content and a task of the event is accomplished. Alternatively, for example, each timing after an elapse of a predetermined time period (for example, an elapse of 24 hours) from the end of the previous first predetermined period may be set as the start timing. A condition for starting the first predetermined period may be included in game data.

The server apparatus 10 is managed by a manager of the game system and has various functions for providing information related to the progress of the game to the user terminals 20, 201 to 20N. In the example of the present embodiment, the server apparatus 10 provides image information and the like of the game content that is permitted to be played. The server apparatus 10 is configured with an information processing apparatus such as a WWW server in order to provide information related to the progress of the video game, and includes a database (storage unit) that stores various information.

Figure 2:
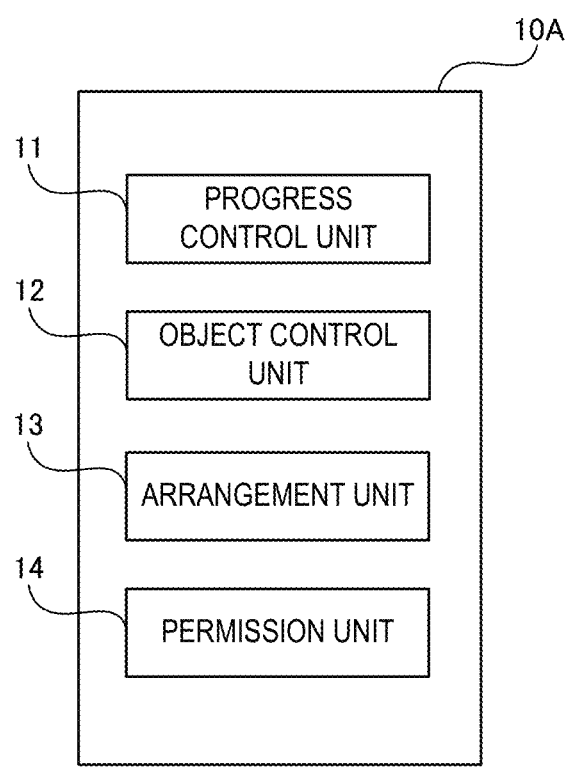
FIG. 2 is a block diagram illustrating a configuration of a server apparatus corresponding to at least one embodiment of the present invention.

FIG. 2 is a function block diagram illustrating a configuration of a server apparatus 10A that is one example of the configuration of the server apparatus 10. The server apparatus 10A includes a storage unit such as an HDD and a control unit configured with a CPU and the like, not illustrated. Detailed descriptions of such units will not be provided. The server apparatus 10A includes at least a progress control unit 11, an object control unit 12, an arrangement unit 13, and a permission unit 14 by causing the control unit to execute software (game processing program) that is stored in the storage unit for controlling the progress of the video game. The game processing program includes the game data.

The progress control unit (progress control function) 11 controls the progress of the plurality of game contents including the first content and the second content. For example, the progress control unit 11 starts a designated game content based on a play request from the user. In addition, for example, the progress control unit 11 generates an event corresponding to a predetermined condition in the game content in progress. Data necessary for executing each game content, each generation condition, and the like may be included in the game data.

The object control unit (object control function) 12 controls the motion of the player object of each user in the game space of the game content. For example, the object control unit 12 controls motions such as movement and attack of the player object of each user based on operation information of the user.

The arrangement unit (arrangement function) 13 arranges the determination areas at the plurality of arrangement positions in the game space of the first content during the first predetermined period. For example, information (positional information and the like) of each arranged determination area may be stored in the storage unit. Any number can be employed as the number of arrangements of determination areas. For example, the number of arrangements may be equal to the first defined number. In this case, the number of arrangements may be included in advance in the game data.

For the user of the player object moved to the determination area before the number of permissions reaches the first defined number, the permission unit (permission function) 14 permits the user to play the second content. For example, based on the positional relationship (positional information and the like) between the player object and the determination area, the permission unit 14 may determine that the player object is moved to the determination area in a case where a part of the player object is included in the determination area. A determination as to whether or not the player object is moved to a predetermined area is a general configuration. Thus, a detailed description of the determination will not be provided.

For example, the permission unit 14 may register permission information in user data of the user who is permitted to play. The user data is information related to the game of the user. The user data of each user may be stored in the storage unit. In addition, for example, identification information of the user who is permitted to play may be stored in the storage unit. For example, the number of permissions may be stored in the storage unit and be increased (updated) each time the play is permitted. The first defined number may be included in the game data.

Each of the terminal apparatuses 20, 201 to 20N is managed by the user playing the game. The terminal apparatuses 20, 201 to 20N are configured with terminal apparatuses such as a personal computer, a mobile phone terminal, personal digital assistants (PDA), and a portable game apparatus that can execute the video game.

Each of the terminal apparatuses 20, 201 to 20N includes a plurality of operation apparatuses (operation units), a storage unit such as an HDD, a control unit that is configured with a CPU and the like and generates a game image by executing the game, a display apparatus (display unit) that displays the game image, a transmission and reception unit that communicates with another apparatus, and the like. Detailed descriptions of such units will not be provided. In the terminal apparatuses 20, 201 to 20N, the software (game processing program as an application program) for executing the game by communicating with the server apparatus 10 is stored in the storage unit. Each of the terminal apparatuses 20, 201 to 20N generates image information of the game content based on image information received from the server apparatus 10.

Next, the operation of the game system 100 (system 100) of the embodiment will be described.

Figure 3:
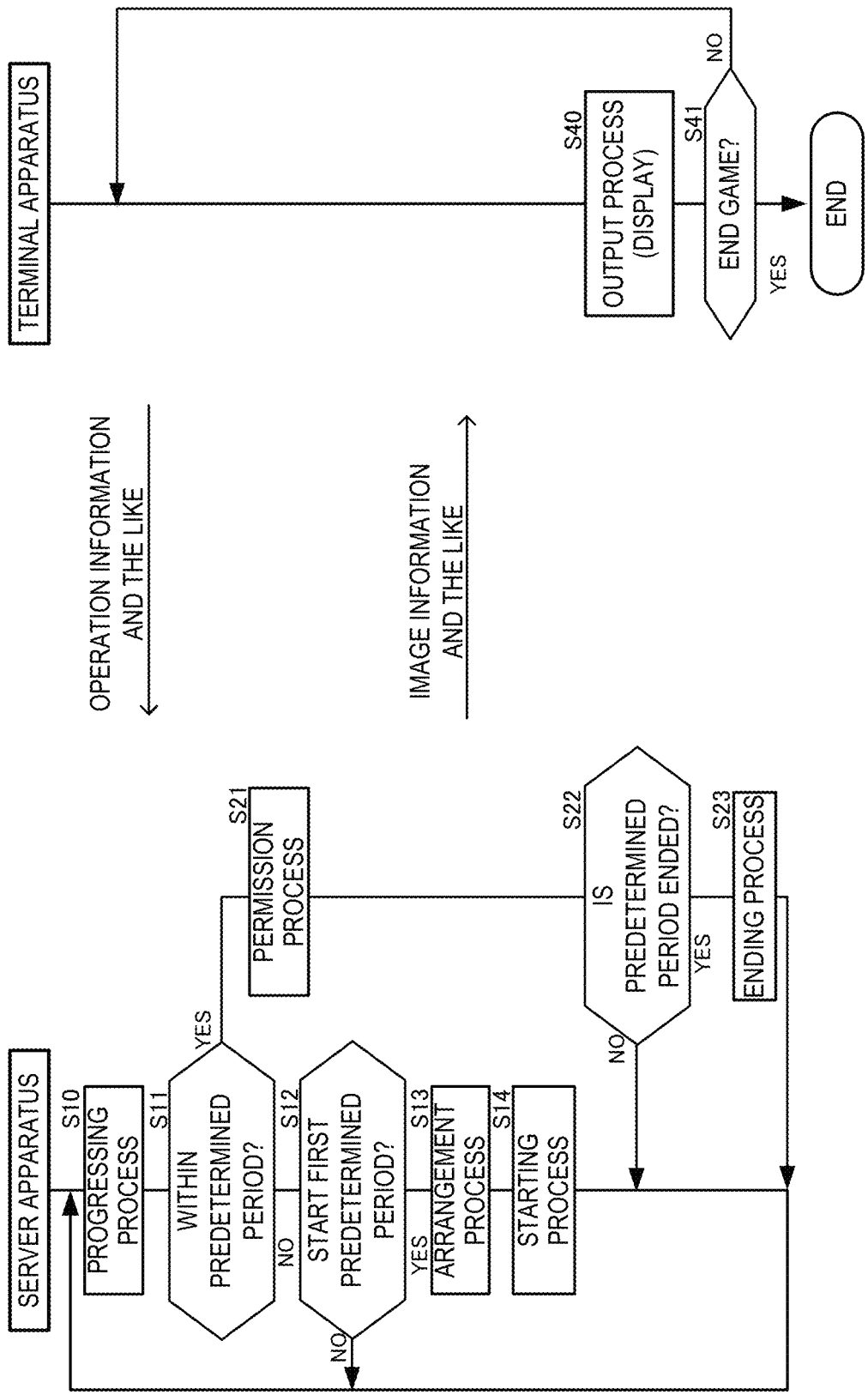
FIG. 3 is a flowchart illustrating an example of a first content progressing process corresponding to at least one embodiment of the present invention.

FIG. 3 is a flowchart illustrating an example of a first content progressing process executed by the system 100. In the first content progressing process in the example of the present embodiment, a process for progressing the first content and a process for permitting the play of the second content are performed. In FIG. 3, the process for permitting the play of the second content is mainly illustrated, and a part of the other process is not illustrated. Hereinafter, a case where the server apparatus 10A and the terminal apparatus 20 execute a progressing process will be illustratively described.

For example, the execution of the first content progressing process of the example of the present embodiment is started in a case where any terminal apparatus makes a request for participating in the first content. FIG. 3 illustrates a state (in-play) where the user of the terminal apparatus 20 is already participating in the first content.

The server apparatus 10A executes the progressing process of progressing the game (first content) based on the operation information and the like of the user received from the terminal apparatus 20 (step S10). For example, a process of causing the player character to execute motions such as movement and attack is performed based on the operation information of the user received together with the identification information of the user. In addition, for example, a process of generating an event is executed. In one progressing process, for example, a process for generating the game image and audio corresponding to one frame is performed.

Next, the server apparatus 10A determines whether or not the current time is within the first predetermined period (step S11). For example, in a case where the value of a predetermined flag stored in the storage unit indicates that the current time is within the first predetermined period, the server apparatus 10A may determine that the current time is within the first predetermined period. In a case where the current time is not within the first predetermined period (step S11: NO), the server apparatus 10A determines whether or not to start the first predetermined period (step S12). As described above, for example, in a case where a predetermined event occurs in the first content, and the task of the event is accomplished, the server apparatus 10A may determine to start the first predetermined period.

In a case where the first predetermined period is not started (step S12: NO), the server apparatus 10A returns to the process of step S10. In a case where the first predetermined period is started (step S12: YES), the server apparatus 10A executes an arrangement process (step S13). In the arrangement process, as described above, the determination areas corresponding to the number of arrangements are arranged at the plurality of arrangement positions in the game space of the first content. For example, the plurality of arrangement positions may be obtained by randomly selecting any position in the game space. In addition, the server apparatus 10A may store the plurality of arrangement positions in the storage unit.

Then, the server apparatus 10A executes a starting process (step S14). In the starting process, for example, the predetermined flag is changed to the value indicating that the current time is within the first predetermined period, and the end time of the first predetermined period is set. Then, the server apparatus 10A returns to the process of step S10.

Next, returning to the process of step S11, in a case where the current time is within the first predetermined period (step S11: YES), the server apparatus 10A executes a permission process (step S21). In the permission process, for example, as described above, the server apparatus 1 OA determines whether or not each player object is moved to any determination area. For example, the server apparatus 10A refers to the positional information of the player object that is updated in the progressing process. The server apparatus 10A permits the user of the player object moved to the determination area to play the second content. For example, the server apparatus 10A stores the identification information of the user who is permitted to play in the storage unit. In the permission process, the user is not permitted to play the second content in a state where the number of permissions already reaches the first defined number. In the permission process, the server apparatus 10A increases the number of permissions in the storage unit by the number of users who are permitted to play the second content.

Next, the server apparatus 10A determines whether or not the first predetermined period is ended (step S22). For example, in a case where the set end time is reached, the server apparatus 10A may determine that the first predetermined period is ended.

In a case where the first predetermined period is not ended (step S22: NO), the server apparatus 10A returns to the process of step S10. In a case where the first predetermined period is ended (step S22: YES), the server apparatus 10A executes an ending process (step S23). In the ending process, for example, the predetermined flag is changed to a value that indicates that the current time is not within the first predetermined period. Then, the server apparatus 10A returns to the process of step S10.

In addition, while illustration is not provided, the server apparatus 10A generates the image information for generating the images of the game space and the like of the first content progressed by above each process and transmits the image information to the terminal apparatus 20. Until the end of the game (step S41: YES), the terminal apparatus 20 displays the game image based on the image information received from the server apparatus 10A on the display unit (step S40). For example, in a case where an end request is received from the user (step S41: YES), the terminal apparatus 20 ends the execution of the first content.

In addition, while illustration is not provided, in a case where the user who is permitted to play the second content occurs in the first content progressing process, the server apparatus 10A executes a second content progressing process along with the first content progressing process.

While the process illustrated in FIG. 3 is described for the terminal apparatus 20, the same process is performed for the terminal apparatus of the user of each player object in the same (common) game space in the first content. That is, for each user (player object), a determination as to whether or not the determination area is reached is performed, and the play of the second content is permitted.

As described thus far, as one aspect of the first embodiment, it is configured that the server apparatus 10A includes the progress control unit 11, the object control unit 12, the arrangement unit 13, and the permission unit 14. Thus, the user who is permitted to play the second content is decided using the determination areas arranged in the game space of the first content. Accordingly, the play is permitted considering a play situation and the like of the game. Thus, the user who is permitted to participate can be appropriately decided for the game content such as the second content in which the number of participating users is set.

The above-described "player object" is an object operated by the user. For example, a character such as a person, a robot, and an animal, a vehicle such as an automobile, a spherical object such as a ball, and a card correspond to the player object. The "game space" may be either a three-dimensional virtual space or a two-dimensional virtual space as long as the player object is operated in the virtual space.

The above-described "video game" may employ a game of any genre such as a role-playing game, a caring game, and a simulation game as long as it is configured that a plurality of game contents in which one or more users can participate is included.

The decision of the above-described plurality of arrangement positions can employ any configuration. For example, the determination areas may be arranged at a plurality of arrangement positions that are set in advance. In this case, information of each arrangement position may be included in the game data. Alternatively, for example, a plurality of pieces of positional information (candidate positions) as arrangement position candidates may be included in the game data, and positions that are randomly selected in number corresponding to the number of arrangements from the plurality of candidate positions may be set as the arrangement positions.

The above-described first defined number may be a fixed value that is set in advance, or a value that changes depending on a predetermined configuration. For example, the first defined number may be changed depending on the game level (average level) of the user participating in the first content.

The above-described determination area can employ any form as long as it is configured that reaching of the player object can be determined. For example, the determination area may be an area of a cylindrical shape. In addition, it is desirable to use an object as the determination area such that the object is displayed in the game image and visually recognizable by the user.

In the example of the above-described embodiment, the first predetermined period is ended along with an elapse of time. However, the first predetermined period may be immediately ended in a case where the first defined number is reached before the elapse of time. In the example of the embodiment, a determination as to whether or not the total value of the number of permissions reaches the first defined number is performed. However, the embodiment is not for limitation purposes. For example, a predetermined number obtained by dividing the first defined number is set for each determination area. In the determination area in which the predetermined number is reached, it may be configured that the user is not permitted to play the second content.

In the example of the above-described embodiment, in a case where the player object is moved to the determination area, the play of the second content is permitted. Alternatively, establishment of another predetermined condition for permitting the play may be set as a permission condition. For example, in a case where the player object is moved to the determination area, and the user (player object) possesses a predetermined item, the permission may be provided.

In the example of the above-described embodiment, in a case where the play of the second content is permitted, for example, the first content may be ended (or stopped), and the play of the second content may be started without the consent of the user. Alternatively, for example, after the play of the second content is permitted, the play of the second content may be started based on a participation request (operation information) for the second content from the user.

Second Embodiment

Figure 4:
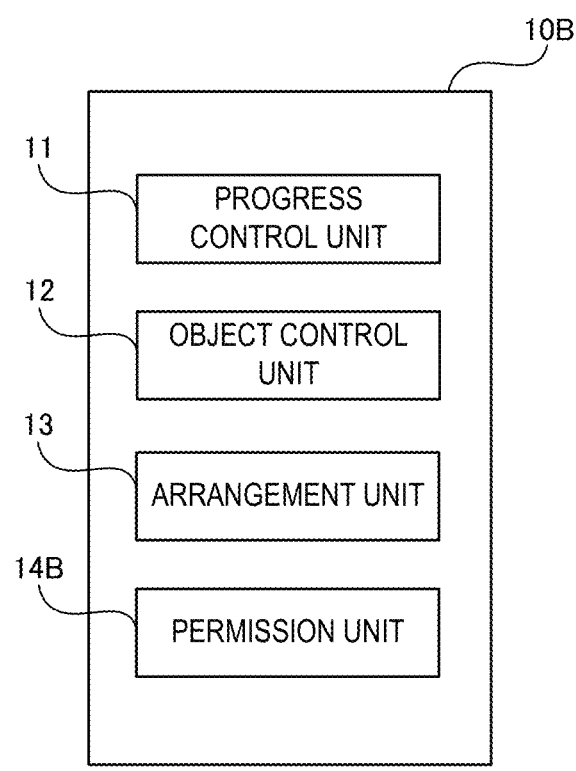
FIG. 4 is a block diagram illustrating a configuration of the server apparatus corresponding to at least one embodiment of the present invention.

FIG. 4 is a block diagram illustrating a configuration of a server apparatus 10B that is an example of the server apparatus 10. In the present example, the server apparatus 10B includes at least the progress control unit 11, the object control unit 12, the arrangement unit 13, and a permission unit 14B.

In the example of the present embodiment, the number of users who are permitted to play the second content is set for each determination area. For example, the number of permitted users is set to 1 for one determination area. In the example, the permission is provided to a user A of the player object that reaches a certain determination area A first. However, the permission is not provided to another user B of the player object that subsequently reaches the determination area A. Accordingly, the other user B has to find a different determination area.

Specifically, the predetermined number obtained by dividing the first defined number is set for each determination area. In the determination area in which the number of permissions already reaches the predetermined number, the user is not permitted to play the second content. Accordingly, even in the example of the present embodiment, the total of the number of users provided with the permission is the first defined number. For example, in a case where the first defined number is 50, and the predetermined number for the determination area is 1, the number of arrangements of determination areas is 50. For example, the number of arrangements and the predetermined number for each determination area may be included in the game data in advance.

The progress control unit 11 controls the progress of the plurality of game contents including the first content and the second content. For example, the progress control unit 11 starts the designated game content based on the play request from the user. In addition, for example, the progress control unit 11 generates the event corresponding to the predetermined condition in the game content in progress. The object control unit 12 controls the motion of the player object of each user in the game space of the game content. For example, the object control unit 12 controls motions such as movement and attack of the player object of each user based on the operation information of the user.

The arrangement unit 13 arranges the determination areas at the plurality of arrangement positions in the game space of the first content during the first predetermined period. For example, information (positional information and the like) of each arranged determination area may be stored in the storage unit. As described above, the number of arrangements of determination areas is decided depending on the relationship between the first defined number and the predetermined number for one determination area. As in the example, in a case where the first defined number is 50, and the predetermined number for the determination area is 1, the number of arrangements of determination areas is 50.

For the user of the player object moved to the determination area before the number of permissions reaches the first defined number, the permission unit 14B permits the user to play the second content. For example, based on the positional relationship (positional information and the like) between the player object and the determination area, the permission unit 14B may determine that the player object is moved to the determination area in a case where a part of the player object is included in the determination area.

For example, the permission unit 14B stores the number of permitted users (number of permissions) for each determination area in the storage unit. For the determination area in which the number of permissions reaches the predetermined number, the permission unit 14B does not permit the user to play the second content even in a case where the player object is moved to the determination area. For the determination area in which the number of permissions does not reach the predetermined number, the permission unit 14B permits the user to play the second content and increases (updates) the number of permissions for the determination area in the storage unit.

In addition, for example, the permission unit 14B may register the permission information in the user data of the user who is permitted to play. The user data of each user may be stored in the storage unit. In addition, for example, the permission unit 14B may store the identification information of the user who is permitted to play in the storage unit. For example, the number of permissions may be stored in the storage unit and be increased (updated) each time the play is permitted.

Figure 5:
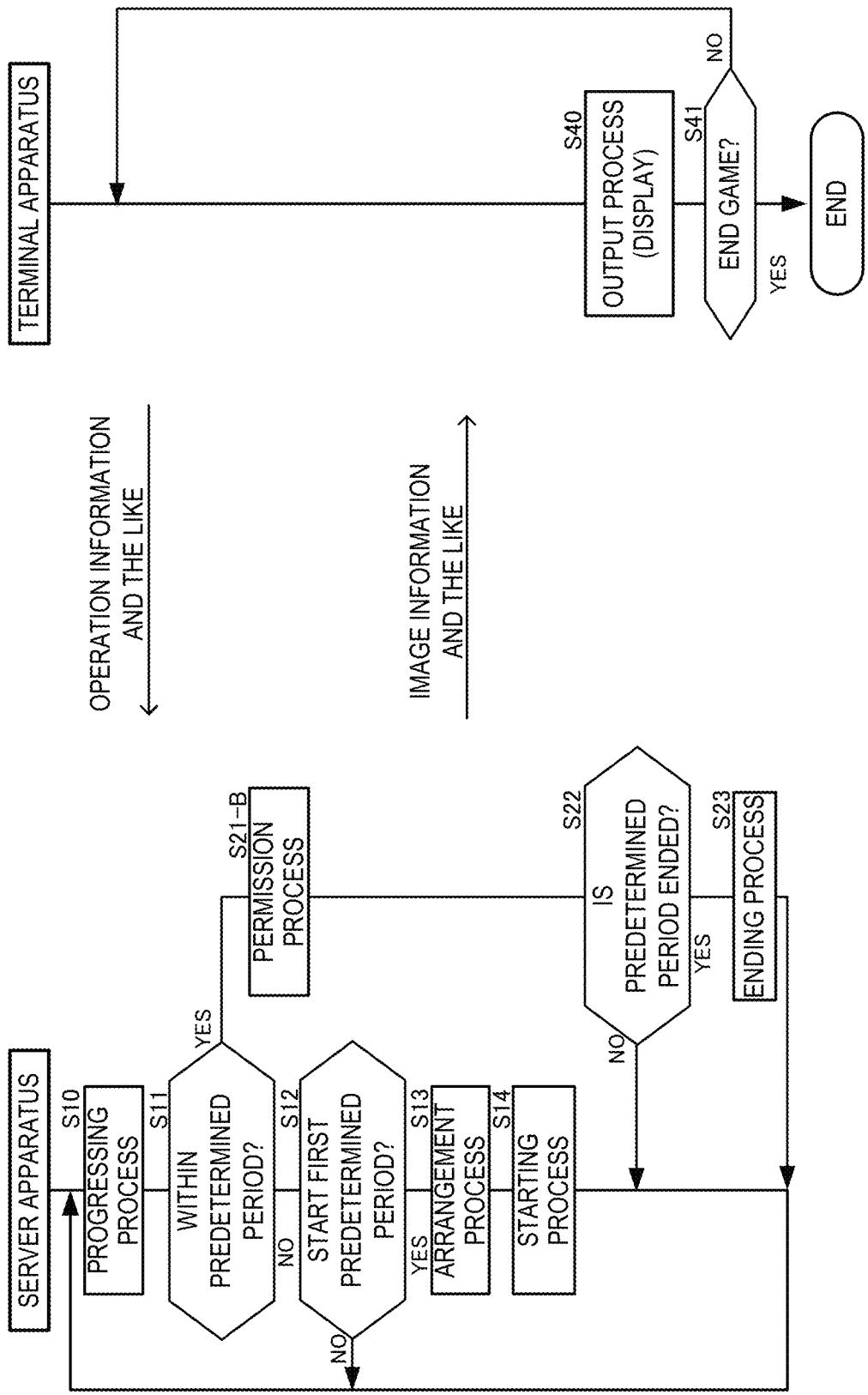
FIG. 5 is a flowchart illustrating an example of the first content progressing process corresponding to at least one embodiment of the present invention.

FIG. 5 is a flowchart illustrating an example of the first content progressing process executed by the system 100. In the first content progressing process in the example of the present embodiment, the process for progressing the first content and the process for permitting the play of the second content are performed. In FIG. 5, the process for permitting the play of the second content is mainly illustrated, and a part of the other process is not illustrated. Hereinafter, a case where the server apparatus 10B and the terminal apparatus 20 execute the progressing process will be illustratively described.

For example, the execution of the first content progressing process of the example of the present embodiment is started in a case where any terminal apparatus makes a request for participating in the first content. FIG. 5 illustrates a state (in-play) where the user of the terminal apparatus 20 is already participating in the first content.

The server apparatus 10B executes the progressing process of progressing the game (first content) based on the operation information and the like of the user received from the terminal apparatus 20 (step S10). For example, the process of causing the player character to execute motions such as movement and attack is performed based on the operation information of the user received together with the identification information of the user. In addition, for example, the process of generating the event is executed.

Next, the server apparatus 10B determines whether or not the current time is within the first predetermined period (step S11). For example, in a case where the value of the predetermined flag stored in the storage unit indicates that the current time is within the first predetermined period, the server apparatus 10B may determine that the current time is within the first predetermined period. In a case where the current time is not within the first predetermined period (step S11: NO), the server apparatus 10B determines whether or not to start the first predetermined period (step S12). As described above, for example, in a case where the predetermined event is generated in the first content, and the task of the event is accomplished, the server apparatus 10B may determine to start the first predetermined period.

In a case where the first predetermined period is not started (step S12: NO), the server apparatus 10B returns to the process of step S10. In a case where the first predetermined period is started (step S12: YES), the server apparatus 10B executes the arrangement process (step S13). In the arrangement process, as described above, the determination areas corresponding to the number of arrangements are arranged at the plurality of arrangement positions in the game space of the first content. For example, the plurality of arrangement positions may be obtained by randomly selecting any position in the game space. In addition, the server apparatus 10B may store the plurality of arrangement positions in the storage unit.

Then, the server apparatus 10B executes the starting process (step S14). In the starting process, for example, the predetermined flag is changed to the value indicating that the current time is within the first predetermined period, and the end time of the first predetermined period is set. Then, the server apparatus 10B returns to the process of step S10.

Next, returning to the process of step S11, in a case where the current time is within the first predetermined period (step S11: YES), the server apparatus 10B executes the permission process (step S21-B). In the permission process, for example, as described above, the server apparatus 10B determines whether or not each player object is moved to any determination area. A determination as to whether or not the number of permissions for the determination area to which the player object moves reaches the predetermined number is performed. In a case where the predetermined number is not reached, the server apparatus 10B permits the user of the player object moved to the determination area to play the second content. For example, the server apparatus 10B stores the identification information of the user who is permitted to play in the storage unit. In addition, the server apparatus 10B updates (increases by one) the number of permissions for the determination area. In the permission process, the user is not permitted to play the second content in a state where the number of permissions for each of all determination areas reaches the predetermined number (state where the number of permissions already reaches the first defined number).

Next, the server apparatus 10B determines whether or not the first predetermined period is ended (step S22). For example, in a case where the set end time is reached, the server apparatus 10B may determine that the first predetermined period is ended.

In a case where the first predetermined period is not ended (step S22: NO), the server apparatus 10B returns to the process of step S10. In a case where the first predetermined period is ended (step S22: YES), the server apparatus 10B executes the ending process (step S23). In the ending process, for example, the predetermined flag is changed to the value indicating that the current time is not within the first predetermined period. Then, the server apparatus 10B returns to the process of step S10.

In addition, while illustration is not provided, the server apparatus 10B generates the image information for generating the images of the game space and the like of the first content progressed by above each process and transmits the image information to the terminal apparatus 20. Until the end of the game (step S41: YES), the terminal apparatus 20 displays the game image based on the image information received from the server apparatus 10B on the display unit (step S40). For example, in a case where the end request is received from the user (step S41: YES), the terminal apparatus 20 ends the execution of the first content.

In addition, while illustration is not provided, in a case where the user who is permitted to play the second content occurs in the first content progressing process, the server apparatus 10B executes the second content progressing process along with the first content progressing process.

While the process illustrated in FIG. 5 is described for the terminal apparatus 20, the same process is performed for the terminal apparatus of the user of each player object in the same (common) game space in the first content. That is, for each user (player object), a determination as to whether or not the determination area is reached is performed, and the play of the second content is permitted.

As described thus far, as one aspect of the second embodiment, it is configured that the server apparatus 10B includes the progress control unit 11, the object control unit 12, the arrangement unit 13, and the permission unit 14B. Thus, the user who is permitted to play the second content is decided using the determination areas arranged in the game space of the first content. Accordingly, the play is permitted considering the play situation and the like of the game. Thus, the user who is permitted to participate can be appropriately decided for the game content such as the second content in which the number of participating users is set.

In addition, the number of users who are permitted to play the second content is set for each determination area. Thus, even in a case where the determination area is discovered after another user (player object), the play of the second content may not be permitted, and the pleasure of finding the determination area by the user is increased.

The predetermined number for each determination area may not be the same in all determination areas. Any predetermined number can be set as long as the predetermined number is within the range of the first defined number. In addition, the form of the determination area may be changed depending on the predetermined number set for the determination area.

Third Embodiment

Figure 6:
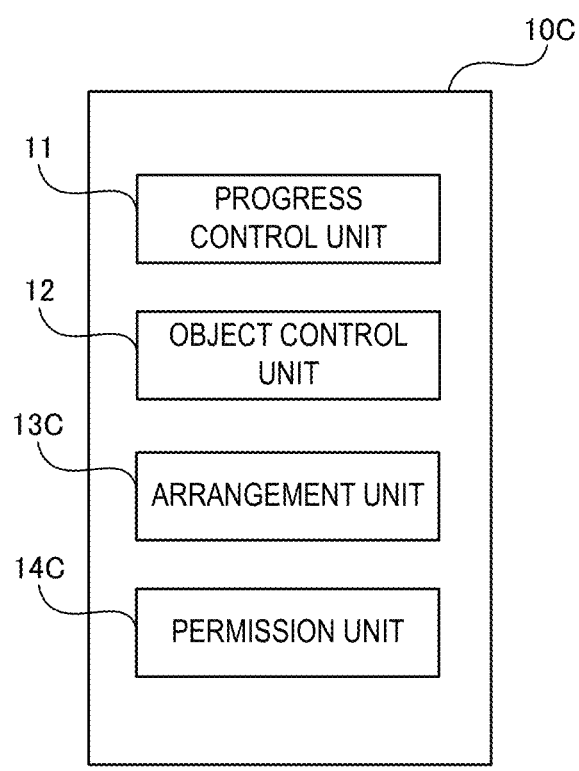
FIG. 6 is a block diagram illustrating a configuration of the server apparatus corresponding to at least one embodiment of the present invention.

FIG. 6 is a block diagram illustrating a configuration of a server apparatus 10C that is an example of the server apparatus 10. In the present example, the server apparatus 10C includes at least the progress control unit 11, the object control unit 12, an arrangement unit 13C, and a permission unit 14C.

In the example of the present embodiment, the number of users who are permitted to play the second content is set for each determination area in the same manner as the example of the second embodiment. For example, the number of permitted users is set to 1 for one determination area. In the example, the permission is provided to the user A of the player object that reaches the certain determination area A first. However, the permission is not provided to the other user B of the player object that subsequently reaches the determination area A. Accordingly, the other user B has to find a different determination area.

Specifically, the predetermined number obtained by dividing the first defined number is set for each determination area. In the determination area in which the number of permissions already reaches the predetermined number, the user is not permitted to play the second content. Accordingly, even in the example of the present embodiment, the total of the number of users provided with the permission is the first defined number. For example, in a case where the first defined number is 50, and the predetermined number for the determination area is 1, the number of arrangements of determination areas is 50. For example, the number of arrangements and the predetermined number for each determination area may be included in the game data in advance.

Furthermore, in the example of the present embodiment, the determination areas are also arranged in the game space of the first game content during a second predetermined period after the elapse of the first predetermined period. Specifically, the determination area in which the number of permissions does not reach the predetermined number among the determination areas arranged during the first predetermined period is arranged. For example, the arrangement positions of the determination areas in the second predetermined period may be the same positions as the arrangement positions in the first predetermined period.

Accordingly, the user who does not obtain the permission to play the second content during the first predetermined period can find the determination area for obtaining the permission again during the second predetermined period. That is, in the first predetermined period and the second predetermined period, the permission is provided until the total of the number of permissions of the play of the second content reaches the first defined number.

For example, the second predetermined period is five minutes. The start timing of the second predetermined period may be any timing after the elapse (after the end) of the first predetermined period in the execution of the first content. For example, the start timing may be a timing after an elapse of a predetermined time period (for example, after an elapse of five minutes) from the end of the first predetermined period. Alternatively, for example, the start timing may be the end timing of the first predetermined period. A condition for starting the second predetermined period may be included in game data.

In the example of the present embodiment, during the first predetermined period, the user who establishes a predetermined condition is permitted to play the second content among the users of the player objects that move to the determination area. For example, the predetermined condition is possession of a predetermined item by the user (player object). Accordingly, the user cannot acquire the permission by simply moving to the determination area during the first predetermined period. For example, the user data may be referred to for the item possessed by the user.

The progress control unit 11 controls the progress of the plurality of game contents including the first content and the second content. For example, the progress control unit 11 starts the designated game content based on the play request from the user. In addition, for example, the progress control unit 11 generates the event corresponding to the predetermined condition in the game content in progress. The object control unit 12 controls the motion of the player object of each user in the game space of the game content. For example, the object control unit 12 controls motions such as movement and attack of the player object of each user based on the operation information of the user.

The arrangement unit 13C arranges the determination areas at the plurality of arrangement positions in the game space of the first content during the first predetermined period. For example, information (positional information and the like) of each arranged determination area may be stored in the storage unit. As described above, the number of arrangements of determination areas is decided depending on the relationship between the first defined number and the predetermined number for one determination area. As in the example, in a case where the first defined number is 50, and the predetermined number for the determination area is 1, the number of arrangements of determination areas is 50.

In addition, during the second predetermined period, the arrangement unit 13C arranges the determination area in which the number of permissions does not reach the predetermined number among the determination areas arranged during the first predetermined period. The arrangement unit 13C may specify the determination area in which the predetermined number is not reached by referring to the number of permissions updated by the permission unit 14C for each determination area.

For the user of the player object moved to the determination area before the number of permissions reaches the first defined number, the permission unit 14C permits the user to play the second content throughout the first predetermined period and the second predetermined period. For example, based on the positional relationship (positional information and the like) between the player object and the determination area, the permission unit 14C may determine that the player object is moved to the determination area in a case where a part of the player object is included in the determination area. During the first predetermined period, the permission unit 14C provides the permission in a case where the user of the player object for which it is determined that the player object is moved to the determination area satisfies the predetermined condition.

For example, in the first predetermined period and the second predetermined period, the permission unit 14C stores the number of permitted users (number of permissions) for each determination area in the storage unit. For the determination area in which the number of permissions does not reach the predetermined number in the first predetermined period and the second predetermined period, the permission unit 14C permits the user to play the second content and increases (updates) the number of permissions for the determination area in the storage unit. For the determination area in which the number of permissions reaches the predetermined number, the permission unit 14C does not permit the user to play the second content even in a case where the player object is moved to the determination area.

For example, the permission unit 14C may register the permission information in the user data of the user who is permitted to play. The user data of each user may be stored in the storage unit. In addition, for example, the permission unit 14C may store the identification information of the user who is permitted to play in the storage unit. For example, the number of permissions may be stored in the storage unit and be increased (updated) each time the play is permitted.

Figure 7:
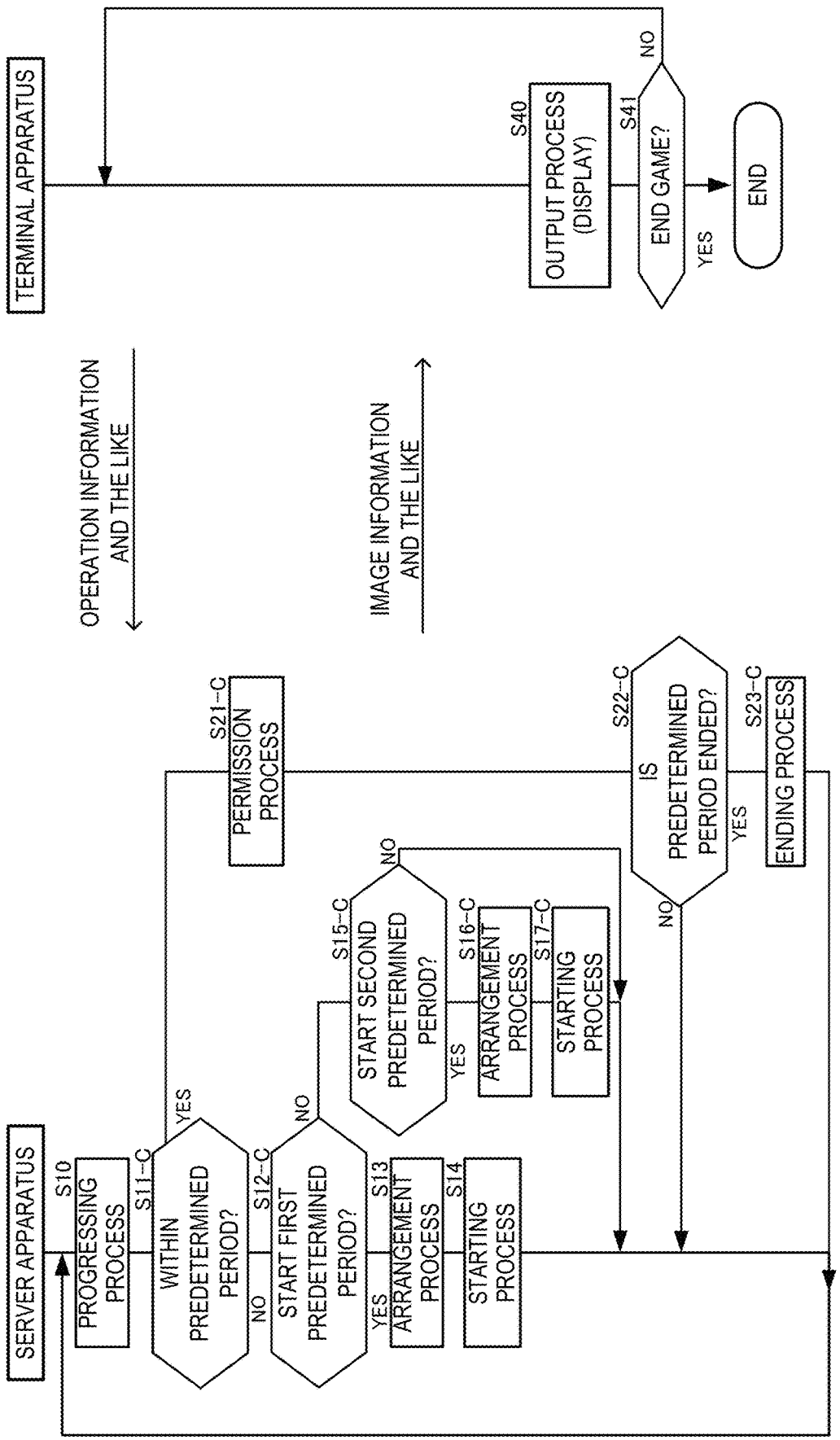
FIG. 7 is a flowchart illustrating an example of the first content progressing process corresponding to at least one embodiment of the present invention.

FIG. 7 is a flowchart illustrating an example of the first content progressing process executed by the system 100. In the first content progressing process in the example of the present embodiment, the process for progressing the first content and the process for permitting the play of the second content are performed. In FIG. 7, the process for permitting the play of the second content is mainly illustrated, and a part of the other process is not illustrated. Hereinafter, a case where the server apparatus 10C and the terminal apparatus 20 execute the progressing process will be illustratively described.

For example, the execution of the first content progressing process of the example of the present embodiment is started in a case where any terminal apparatus makes a request for participating in the first content. FIG. 7 illustrates a state (in-play) where the user of the terminal apparatus 20 is already participating in the first content.

The server apparatus 10C executes the progressing process of progressing the game (first content) based on the operation information and the like of the user received from the terminal apparatus 20 (step S10). For example, the process of causing the player character to execute motions such as movement and attack is performed based on the operation information of the user received together with the identification information of the user. In addition, for example, the process of generating the event is executed.

Next, the server apparatus 10C determines whether or not the current time is within any of the first predetermined period and the second predetermined period (step S11-C). For example, in a case where the value of the predetermined flag stored in the storage unit indicates that the current time is within the first predetermined period, the server apparatus 10C may determine that the current time is within the first predetermined period. In a case where the value of the predetermined flag indicates that the current time is within the second predetermined period, the server apparatus 10C may determine that the current time is within the second predetermined period.

In a case where the current time is not within any of the first predetermined period and the second predetermined period (step S11-C: NO), the server apparatus 10C determines whether or not to start the first predetermined period (step S12-C). As described above, for example, in a case where the predetermined event is generated in the first content, and the task of the event is accomplished, the server apparatus 10C may determine to start the first predetermined period.

In a case where the first predetermined period is started (step S12-C: YES), the server apparatus 10C executes the arrangement process (step S13). In the arrangement process of step S13, as described above, the determination areas corresponding to the number of arrangements are arranged at the plurality of arrangement positions in the game space of the first content. For example, the plurality of arrangement positions may be obtained by randomly selecting any position in the game space. In addition, the server apparatus 10C may store the plurality of arrangement positions in the storage unit in association with the number of permissions. Then, the server apparatus 10C executes the starting process (step S14). In the starting process of step S14, for example, the predetermined flag is changed to the value indicating that the current time is within the first predetermined period, and the end time of the first predetermined period is set. Then, the server apparatus 10C returns to the process of step S10.

In a case where the first predetermined period is not started (step S12-C: NO), the server apparatus 10C determines whether or not to start the second predetermined period (step S15-C). As described above, for example, in a case where a predetermined time period elapses from the end of the first predetermined period, the server apparatus 10C may determine to start the second predetermined period. Specifically, in the process of step S23-C described below, it may be determined that the second predetermined period is started in a case where the set start time of the second predetermined period is reached.

In a case where the second predetermined period is not started (step S15-C: NO), the server apparatus 10C returns to the process of step S10. In a case where the second predetermined period is started (step S15-C: YES), the server apparatus 10C executes the arrangement process (step S16-C). In the arrangement process of step S16-C, as described above, the determination area in which the number of permissions does not reach the predetermined number among the determination areas arranged during the first predetermined period is arranged. For example, the arrangement positions of the determination areas in the second predetermined period are arranged at the same position as the arrangement positions in the first predetermined period. The server apparatus 10C may refer to information in which the plurality of arrangement positions are associated with the number of permissions in the storage unit. In a case where the number of permissions for all determination areas reaches the predetermined number, the execution of the second predetermined period may be ended without arranging the determination areas.

Then, the server apparatus 10C executes the starting process (step S17-C). In the starting process of step S17-C, for example, the predetermined flag is changed to the value indicating that the current time is within the second predetermined period, and the end time of the second predetermined period is set. Then, the server apparatus 10C returns to the process of step S10.

Next, returning to the process of step S11-C, a case where the current time is within any of the first predetermined period and the second predetermined period will be described. In a case where the current time is within any of the first predetermined period and the second predetermined period (step S11-C: YES), the server apparatus 10C executes the permission process (step S21-C). In the permission process, for example, as described above, the server apparatus 10C determines whether or not each player object is moved to any determination area. In addition, a determination as to whether or not the number of permissions for the determination area to which the player object moves reaches the predetermined number is performed.

In a case where the predetermined number is not reached during the first predetermined period, the server apparatus 10C determines whether or not the user of the player object moved to the determination area satisfies the predetermined condition. In a case where the predetermined condition is satisfied, the server apparatus 10C permits the user to play the second content. In a case where the predetermined number is not reached during the second predetermined period, the server apparatus 10C permits the user of the player object moved to the determination area to play the second content. For example, the server apparatus 10C stores the identification information of the user who is permitted to play in the storage unit. In addition, the server apparatus 10C updates (increases by one) the number of permissions for the determination area. In the permission process, the user is not permitted to play the second content in a state where the number of permissions for each of all determination areas reaches the predetermined number (state where the number of permissions already reaches the first defined number).

Next, the server apparatus 10C determines whether or not any predetermined period of the first predetermined period and the second predetermined period is ended (step S22-C). Specifically, in a case where the current time is within the first predetermined period, a determination as to whether or not the first predetermined period is ended is performed. In a case where the current time is within the second predetermined period, a determination as to whether or not the second predetermined period is ended is performed. For example, in a case where the set end time is reached, the server apparatus 10C may determine that the current predetermined period is ended.

In a case where any predetermined period is not ended (step S22-C: NO), the server apparatus 10C returns to the process of step S10. In a case where any predetermined period of the first predetermined period and the second predetermined period is ended (step S22-C: YES), the server apparatus 10C executes the ending process (step S23-C). In the ending process, for example, a determination as to whether or not any predetermined period is ended may be performed by referring to the predetermined flag.

In the ending process, in a case where the first predetermined period is ended, for example, the predetermined flag is changed to a value that indicates that the current time is not within any predetermined period of the first predetermined period and the second predetermined period, and the start time of the second predetermined period is set. By referring to the start time, the start of the second predetermined period is determined in the process of step S15-C. In the ending process, in a case where the second predetermined period is ended, for example, the predetermined flag is changed to the value indicate that the current time is not within any predetermined period of the first predetermined period and the second predetermined period. In the ending process, for example, a determination as to whether the current time is within the first predetermined period or the second predetermined period may be performed by referring to the predetermined flag. Then, the server apparatus 10C returns to the process of step S10.

In addition, while illustration is not provided, the server apparatus 10C generates the image information for generating the images of the game space and the like of the first content progressed by above each process and transmits the image information to the terminal apparatus 20. Until the end of the game (step S41: YES), the terminal apparatus 20 displays the game image based on the image information received from the server apparatus 10C on the display unit (step S40). For example, in a case where the end request is received from the user (step S41: YES), the terminal apparatus 20 ends the execution of the first content.

In addition, while illustration is not provided, in a case where the user who is permitted to play the second content occurs in the first content progressing process, the server apparatus 10C executes the second content progressing process along with the first content progressing process.

In a case where the user of the terminal apparatus 20 acquires the permission to play the second content in the middle of playing the first content, the display of the game image of the game space of the second content is started on the display unit of the terminal apparatus 20.

While the process illustrated in FIG. 7 is described for the terminal apparatus 20, the same process is performed for the terminal apparatus of the user of each player object in the same (common) game space in the first content. That is, for each user (player object), a determination as to whether or not the determination area is reached is performed, and the play of the second content is permitted.

As described thus far, as one aspect of the third embodiment, it is configured that the server apparatus 10C includes the progress control unit 11, the object control unit 12, the arrangement unit 13C, and the permission unit 14C. Thus, the user who is permitted to play the second content is decided using the determination areas arranged in the game space of the first content. Accordingly, the play is permitted considering the play situation and the like of the game. Thus, the user who is permitted to participate can be appropriately decided for the game content such as the second content in which the number of participating users is set.

In addition, the number of users who are permitted to play the second content is set for each determination area. Thus, even in a case where the determination area is discovered after another user (player object), the play of the second content may not be permitted, and the pleasure of finding the determination area by the user is increased.

Furthermore, even during the second predetermined period after the elapse of the first predetermined period, the determination areas are arranged, and the play of the second content is permitted. Thus, dissatisfaction of the user who cannot obtain the permission during the first predetermined period can be reduced.

In the example of the embodiment, it is configured that the arrangement positions of the determination areas in the second predetermined period are maintained at the arrangement positions in the first predetermined period. However, the embodiment is not for limitation purposes. A new arrangement position may be decided during the second predetermined period. In addition, the second predetermined period may not be set.

Furthermore, during the second predetermined period, the permission may not be provided again to the user who is permitted to play the second content during the first predetermined period.

The establishment of the predetermined condition during the first predetermined period of the example of the present embodiment may not be set as the permission condition. In addition, during the second predetermined period, a different condition may be set as the permission condition in addition to the movement of the player object to the determination area.

Fourth Embodiment

Figure 8:
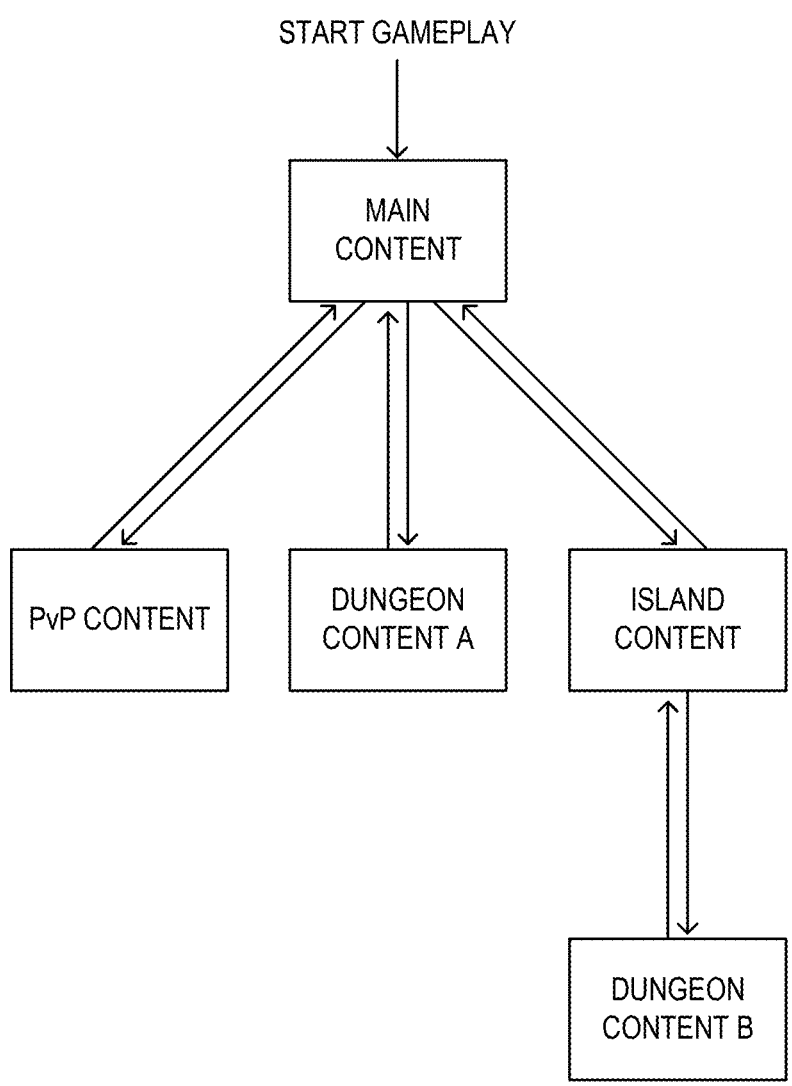
FIG. 8 is a diagram illustrating a summary of game contents corresponding to at least one embodiment of the present invention.

FIG. 8 is a diagram illustrating a summary of the game contents of the game of the example of the present embodiment. A system 100D that is an example of the configuration of the system 100 provides a game that has a plurality of game contents. The game of the example of the present embodiment is configured with game contents such as a main content, a PvP content, a dungeon content A, an island content, and a dungeon content B. The island content corresponds to the first content, and the dungeon content B corresponds to the second content.

The main content is a content of which the task (object) for the user (player) is to progress a main story to the end by operating the player character (player object). More specifically, the main story is progressed by causing the player character to clear a plurality of events (quests) prepared in the main content. For example, the event is a sub-content in which a task (object) of defeating a predetermined enemy character or acquiring a predetermined item is set. The player character can perform motions such as movement and attack in a three-dimensional virtual space (game space) for the main content.

In the example of the present embodiment, the execution of the PvP content, the dungeon content A, and the island content is started by causing the player character to speak to a predetermined non-player character in the game space of the main content. That is, when the play of the game is started, the main content is started. Then, any one content of the PvP content, the dungeon content A, and the island content is executed based on an operation input provided by the user. In addition, after the end of the PvP content, the dungeon content A, and the island content, the main content that is stopped is resumed.

The PvP content is a content for fighting with the player characters of other users through the communication network such as the Internet. A task (object) of the PvP content is to win the fight. The dungeon content A is a content for clearing a dungeon D1. Specifically, a task (object) of the dungeon content A is to progress the player character to the deepest level of the dungeon D1 that is a three-dimensional virtual space (game space). For example, the dungeon D1 is formed in 50 underground levels.

The island content is a content of which the task (object) is to search an island that is a three-dimensional virtual space (game space). A plurality of users can participate in the island content. That is, the player characters of a plurality of users can act in the same (common) game space through the communication network such as the Internet. In the island content, for example, an event in which the player characters of the plurality of users can participate is generated.

The dungeon content B is a content for clearing a dungeon D2. Specifically, a task (object) of the dungeon content B is to cause the player character to defeat a boss character (enemy object) present in the dungeon D2 that is a three-dimensional virtual space (game space).

In the example of the present embodiment, the user can play the dungeon content B by acquiring the permission to play the dungeon content B during the play of the island content. Specifically, at the same time as the acquisition of the permission to play the dungeon content B, the player character of the user in the game space of the island content is moved to the game space of the dungeon content (dungeon D2). At the end of the dungeon content B, the player character of the user is moved again to the game space of the island content from the dungeon D2, and the play of the island content is resumed.

In the example of the present embodiment, the player character enters a portal (object of the determination area) that is generated by clearing (accomplishing the task) a first entry event (first event), and can be moved to the dungeon D2 in a case where a predetermined condition is satisfied. In the example of the present embodiment, two types of portals including a blue portal and a red portal are generated. The generation period of the blue portal corresponds to the first predetermined period, and the generation period of the red portal corresponds to the second predetermined period. Details of the predetermined condition differ between the first predetermined period and the second predetermined period. Details will be described below.

The execution of the dungeon content B is started in a case where any user acquires the permission to play the dungeon content B. The dungeon content B is forcibly ended after an elapse of a time limit (for example, 30 minutes) from the start of the execution.

Figure 9:
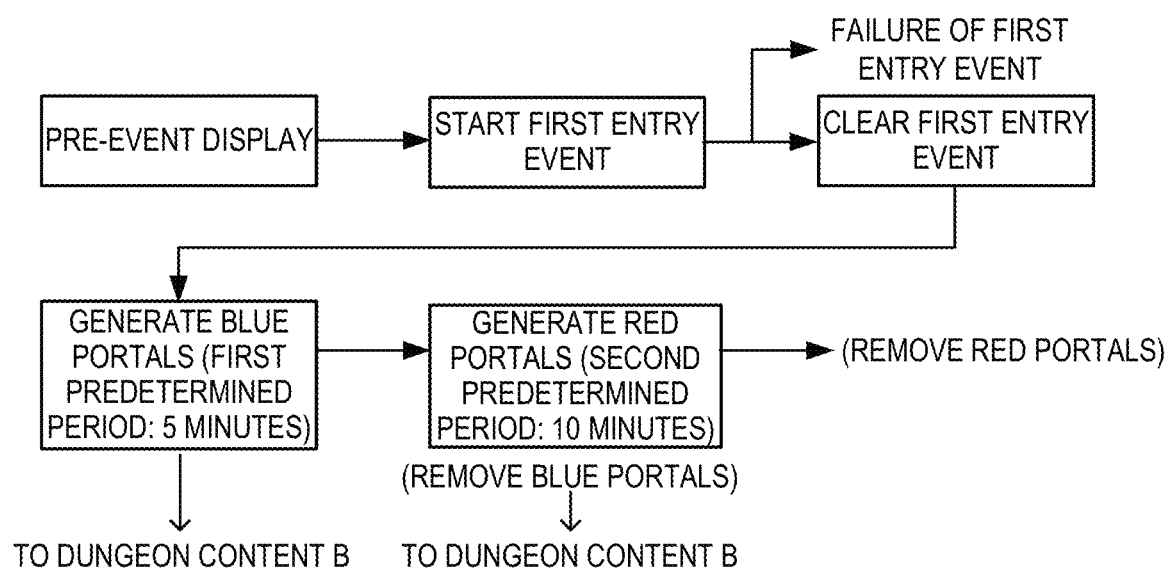
FIG. 9 is a flowchart of generation of a first entry event to movement to a dungeon corresponding to at least one embodiment of the present invention.

FIG. 9 is a flowchart of the acquisition of the permission to play the dungeon content B and movement to the dungeon D2 accompanied by the generation of the first entry event. The first entry event is started in a case where a generation condition is established. For example, the generation condition is that the number of users of which the play level is greater than or equal to a predetermined value (level 60) is greater than or equal to a predetermined number of persons (for example, eight persons) among the users participating in the island content, and the dungeon content B is not in execution. The generation condition is not limited to the example. Any condition can be employed, or the generation condition may not be present.

For example, the generation condition related to the play level is useful in a case where the dungeon content B is for advanced persons. The reason is that it is difficult to clear the dungeon content B in a case where only beginners participate in the dungeon content B.

In a case where the generation condition is established, a display (pre-event display) for notifying the user of the generation of the first entry event is executed. Then, the first entry event is started. The task of the first entry event is to defeat one boss character (enemy object) generated in the game space of the island content. A plurality of users can participate in the first entry event. For example, each user can acquire an entry right by participating in and clearing the first entry event (defeating the boss character). The user who participates in the first entry event but cannot clear the first entry event or quits in the middle of the first entry event cannot acquire the entry right.

Figure 10A:
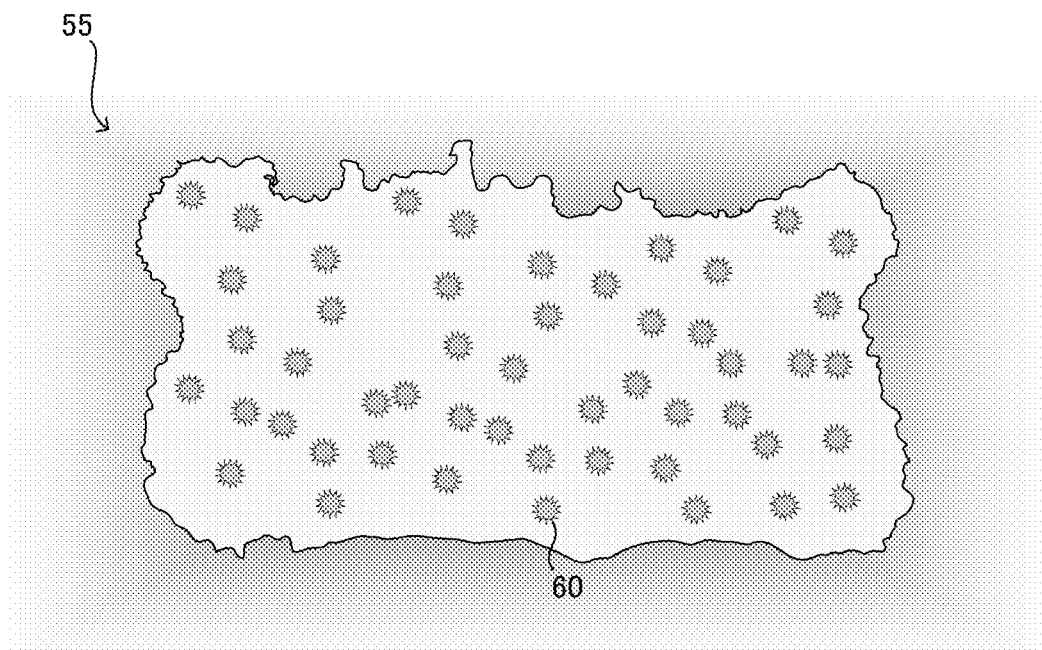
FIGS. 10A and 10B are diagrams illustrating one example of a game space corresponding to at least one embodiment of the present invention.

The first entry event is ended by defeating the boss character. After the first entry event is cleared, objects of a plurality of blue portals are generated (arranged) at places in the game space of the island content. For example, as illustrated in FIG. 10A, 50 blue portals 60 are arranged. FIG. 10A is a plan view of an island that is a game space 55 of the island content. The blue portal 60 is an object having a cylindrical shape.

In the state illustrated in FIG. 10A, the user (player character) finds and enters the blue portal 60. In a case where the user (player character) who enters the blue portal 60 possesses the entry right and a ticket, the play of the dungeon content B is permitted, and the player character is moved to the dungeon D2 from the game space 55. The arrangement positions of the blue portals 60 are randomly decided.

Accordingly, during the generation of the blue portals 60 that is the first predetermined period, the predetermined condition corresponds to possession of two items including the entry right and the ticket. The entry right can only be acquired by participating in and clearing the first entry event. The ticket is an item that can be acquired in the island content. For example, the ticket can be acquired by causing the player character to search the game space 55.

In the example of the present embodiment, in a case where one user (player character) enters the dungeon D2 from a certain blue portal 60, the blue portal 60 is removed.

That is, the number of player characters (users) that can enter one blue portal 60 is only one. Since the number of arrangements of blue portals 60 is 50, the first defined number is 50.

Figure 10B:
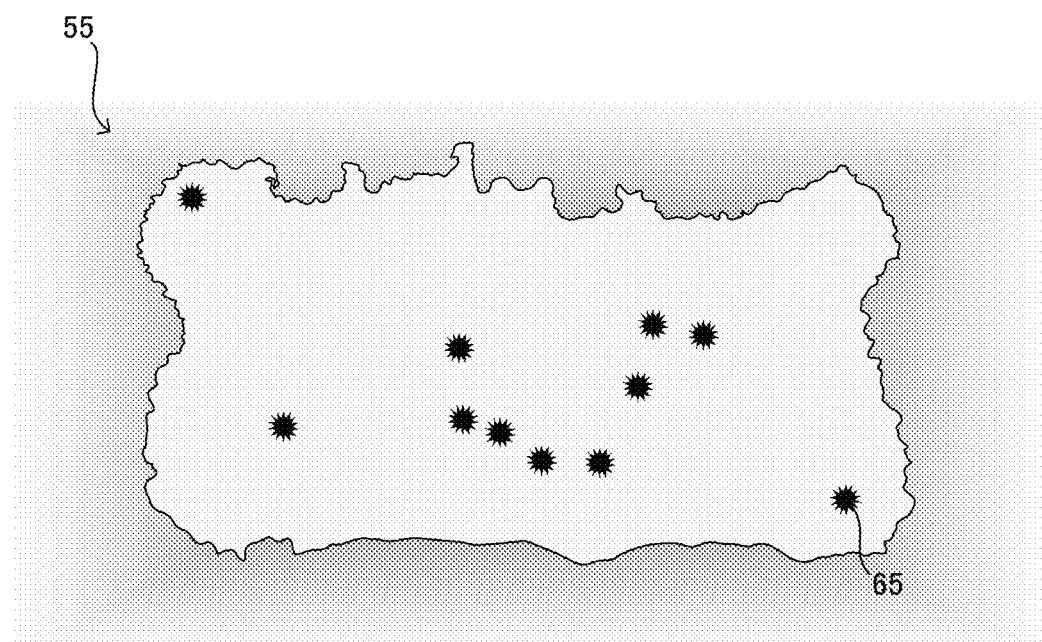

Next, after an elapse of five minutes from the generation of the blue portals 60, the remaining blue portals 60 that are not removed are removed, and red portals 65 are generated (arranged). As illustrated in FIG. 10B, the red portals 65 are arranged at the arrangement positions of the remaining blue portals 60 that are not removed. That is, the remaining blue portals 60 are replaced with the red portals 65. FIG. 10B is a plan view of the game space 55 of the island content.

In this state, the user (player character) finds and enters the red portal 65. In the case of the red portal, the ticket is not necessary unlike the blue portal 60. That is, during the generation of the red portals 65 that is the second predetermined period, the predetermined condition corresponds to possession of the entry right. In a case where the user (player character) who enters the red portal 65 possesses the entry right, the play of the dungeon content B is permitted, and the player character is moved to the dungeon D2 from the game space 55.

For the red portal 65, the number of player characters (users) that can enter one red portal 65 is only one like the blue portal 60. Accordingly, in a case where one user (player character) enters the dungeon D2 from a certain red portal 65, the red portal 65 is removed.

After an elapse of 10 minutes from the generation of the red portals, the remaining red portals that are not removed are removed. In the example of the present embodiment, during the generation of the blue portals 60, it is necessary to obtain the ticket. Thus, the user who plays the island content for a long time period is advantageous. Items such as the entry right and the ticket are registered as possessed items in the user data of the user.

The player character moved to the dungeon content B is arranged at a predetermined location in the dungeon D2 and can be moved after the red portal 65 is removed. That is, the progress of the dungeon content B is started after the red portal 65 is removed.

In the example of the present embodiment, the player character can also be moved to the dungeon D2 by entering the red portal 65 (object of the determination area) that is generated by clearing (accomplishing a task) a second entry event (second event). The second entry event is generated in a case where the dungeon content B is progressed to a predetermined situation by the player character that is moved to the dungeon D2 after the first entry event. That is, a generation condition for the second entry event is that the progress situation of the dungeon content B that is already in execution is changed to the predetermined situation. For example, the predetermined situation is a situation where the player character pushes an object of a switch arranged in the dungeon D2. Accordingly, in a case where all player characters of the dungeon content B are defeated before pushing the switch in the dungeon D2, the second entry event is not generated. The generation condition is not limited to the example. Any condition can be employed.

As described above, the second entry event is generated during the execution of the dungeon content B. Thus, the user who cannot acquire the permission after the generation of the first entry event can try again.

Figure 11:
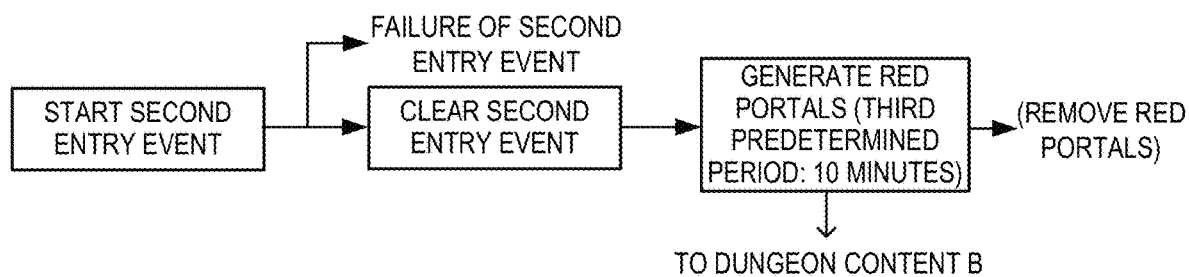
FIG. 11 is a flowchart of generation of a second entry event to movement to a dungeon corresponding to at least one embodiment of the present invention.

FIG. 11 is a flowchart of the acquisition of the permission to play the dungeon content B and movement to the dungeon D2 accompanied by the generation of the second entry event. In a case where the generation condition is established, the second entry event is started. The task of the second entry event is to defeat one boss character (enemy object) generated in the game space 55 of the island content. A plurality of users can participate in the second entry event. For example, each user can acquire an entry right by participating in and clearing (accomplishing a task) the second entry event. The user who participates in the second entry event but cannot clear the second entry event or quits in the middle of the second entry event cannot acquire the entry right.

The second entry event is ended by defeating the boss character. By clearing the second entry event, the objects of the plurality of red portals 65 are generated (arranged) at a plurality of arrangement positions in the game space 55. For example, eight red portals 65 are arranged. The arrangement positions of the red portals 65 are randomly decided.

The red portal 65 has the same configuration as the red portal 65 generated by the first entry event. That is, the user (player character) finds and enters the red portal 65. In a case where the user (player character) who enters the red portal 65 possesses the entry right by clearing the second entry event, the play of the dungeon content B is permitted, and the player character is moved to the dungeon D2. In this case, the movement of the player character may be such that the player character is moved to the position at which the player character is already present in the dungeon D2.

Even for the red portal 65, the number of player characters (users) that can enter one red portal 65 is only one. Accordingly, in a case where one user (player character) enters the dungeon D2 from a certain red portal 65, the certain red portal 65 is removed. Since the number of arrangements of red portals 65 is 8, a second defined number is 8. After an elapse of 10 minutes from the generation of the red portals 65, the remaining red portals that are not removed are removed.

Figure 12:
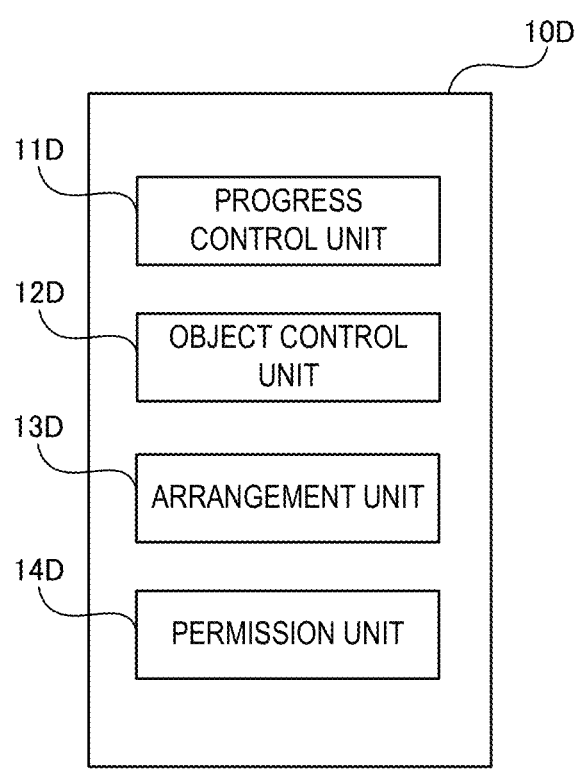
FIG. 12 is a block diagram illustrating a configuration of the server apparatus corresponding to at least one embodiment of the present invention.

FIG. 12 is a function block diagram illustrating a configuration of a server apparatus 10D that is one example of the configuration of the server apparatus 10. The server apparatus 10D includes a storage unit such as an HDD and a control unit configured with a CPU and the like, not illustrated. Detailed descriptions of such units will not be provided. The server apparatus 10D includes at least a progress control unit 11D, an object control unit 12D, an arrangement unit 13D, and a permission unit 14D by causing the control unit to execute software (game processing program) that is stored in the storage unit for controlling the progress of the video game. The game processing program includes the game data.

The progress control unit 11D controls the progress of a plurality of game contents as illustrated in FIG. 8. For example, the designated game content is started based on the play request from the user. In addition, as described above, the progress control unit 11D generates the entry event in the island content. Data necessary for executing each game content, each generation condition, and the like may be included in the game data.

In addition, the progress control unit 11D generates a participating user list for each game content. The participating user list is used for controlling the motion of the player character of the user playing the game content and updating information of the possessed item and the like. The progress control unit 11D acquires the user data for which the participation request is made in the game content from master data in the storage unit and sets the user data in the participating user list of the corresponding game content. In addition, for the user who ends the play of the game content, the progress control unit 11D reflects the details of the user data set in the participating user list on the user data as the master data in the storage unit. Then, the user data registered in the participating user list is deleted.

FIG. 13A is a diagram illustrating one example of the participating user list of the island content. FIG. 13B is a diagram illustrating one example of the user data. The participating user list is configured with fields such as a management number and a participating user. A management number is set in the field of the management number. The participating user is associated with each management number. The user data of the user participating in the island content is set in the field of the participating user. The user data of the participating user list is updated depending on the progress of the game.

The user data is information related to the game of the user. The master data is stored in the storage unit of the server apparatus 10D. The user data is configured with fields such as a user ID, a character status, and a possessed item.

Identification information (user ID) of the user is set in the field of the user ID. Various information of the player character is set in the field of the character status. The field of the character status is configured with fields such as a character ID, a name, a parameter, and coordinates.

Identification information (character ID) of the character is set in the field of the character ID. Text data of the name of the player character is set in the field of the name. Various parameters (numerical value information) of the character (character ID) such as the maximum value and the current value of health and attack power (HP) are set in the field of the parameter. Current positional information of the player character is set in the field of the coordinates. Specifically, coordinate information of a world coordinate system of the game space of the island content is set.

Identification information (item ID) of the item possessed by the user (player character) is set in the field of the possessed item. For example, identification information of the entry right, the ticket, and the like is set.

The object control unit 12D controls the motion of the player object (player character) of each user in the game space of the game content. For example, the object control unit 12D refers to the participating user list and controls motions such as movement and attack of the player character of each user based on the operation information of the user. In addition, the object control unit 12D updates the setting details of the participating user list based on the control result.

The arrangement unit 13D arranges 50 determination areas (blue portals 60) at 50 arrangement positions in the game space of the first content (island content) during the first predetermined period. The first predetermined period is a period in which the blue portals are arranged after the end of the first entry event. The arrangement unit 13D sets randomly selected positions (coordinate information) in the game space 55 of the island content as the arrangement positions. Information of the arrangement positions is registered in a first arrangement list.

FIG. 14 is a diagram illustrating one example of the first arrangement list. The first arrangement list is used for managing the determination areas (the blue portals 60 and the red portals 65) in the first predetermined period and the second predetermined period. The second predetermined period is a period in which the red portals 65 are arranged after the elapse of the first predetermined period.

The first arrangement list is configured with fields such as a management number, coordinates, and a permission record. A management number is set in the field of the management number. Coordinates and a permission record are associated with each management number. In the field of the management number, 1 to 50 of the number of arrangements of determination areas are set. The coordinate information of the determination area corresponding to the management number in the game space 55 is set in the field of the coordinates. The game space 55 is a three-dimensional virtual space. The coordinate information of the world coordinate system of the game space 55 is set in the field of the coordinates.

The permission record of the play of the dungeon content B in the determination area corresponding to the management number is set in the field of the permission record. For example, in a case where the number of permission records is one, a numerical value 1 is set. In a case where the permission record is not present, a numerical value 0 is set. In the example of the present embodiment, only one user is permitted to play the dungeon content B for one determination area. Thus, only 0 or 1 is set.

The arrangement unit 13D removes the blue portals 60 after the end of the first predetermined period and arranges the red portals 65 during the second predetermined period. Specifically, among the blue portals 60 arranged during the first predetermined period, the arrangement unit 13D changes the blue portal 60 in which the number of permissions does not reach the predetermined number to the red portal 65 and arranges the red portal 65 during the second predetermined period.

In the example of the present embodiment, only one user is permitted to play the dungeon content B for one determination area. Thus, the predetermined number is 1. Accordingly, by referring to the first arrangement list, the arrangement unit 13D arranges the red portal 65 at coordinates corresponding to the management number of 0 permission records. The red portal 65 is not arranged at coordinates corresponding to the management number of one permission record in the arrangement list. The arrangement unit 13D deletes the red portals 65 after the end of the second predetermined period.

In addition, the arrangement unit 13D arranges 8 determination areas (red portals 65) at 8 arrangement positions in the game space 55 of the first content (island content) during a third predetermined period. The third predetermined period is a period in which the red portals 65 are arranged after the end of the second entry event. The arrangement unit 13D sets randomly selected positions (coordinate information) in the game space 55 of the island content as the arrangement positions. Information of the arrangement positions is registered in a second arrangement list. While illustration is not provided, the second arrangement list has the same configuration as the first arrangement list of the management number 1 to 8. Even during the third predetermined period, only one user is permitted to play the dungeon content B for one determination area. Thus, the predetermined number is 1. The arrangement unit 13D deletes the red portals 65 after the end of the third predetermined period.

The participating user list, the first arrangement list, and the second arrangement list may be stored in the storage unit of the server apparatus 10D.

Next, the permission unit 14D permits the user of the player object moved to the determination area (the blue portal 60 or the red portal 65) to play the second content (dungeon content B) throughout the first predetermined period and the second predetermined period until the number of permissions reaches the first defined number 50.

Specifically, during the first predetermined period, based on the positional relationship between the player character and the blue portal 60, it is determined that the player character is moved to the blue portal 60 in a case where a part of the player character is included in the blue portal 60. Furthermore, by referring to the participating user list, the permission unit 14D determines whether or not the player character (user) for which it is determined that the player character is moved to the blue portal 60 possesses the entry right and the ticket.

The permission unit 14D permits the user possessing the entry right and the like to play the dungeon content B. Specifically, the permission unit 14D moves the user data of the permitted user from the participating user list of the island content illustrated in FIG. 13A to the participating user list of the dungeon content B. Accordingly, a display of the game image of the dungeon D2 is started on the display unit of the terminal apparatus of the user. In addition, the permission unit 14D updates (increases by one) the permission records of the first arrangement list and the second arrangement list corresponding to the determination area of the permission.

In addition, during the second predetermined period, based on the positional relationship between the player character and the red portal 65, the permission unit 14D determines that the player character is moved to the red portal 65 in a case where a part of the player character is included in the red portal 65. A determination as to whether or not the player character (user) for which it is determined that the player character is moved to the red portal 65 possesses the entry right is performed by referring to the participating user list. The permission unit 14D permits the user possessing the entry right to play the dungeon content B and updates the permission record as described above.

Furthermore, during the third predetermined period, the permission unit 14D permits the play of the dungeon content B and updates the permission record in the same manner as during the second predetermined period.

For the determination area in which the number of permission records reaches the predetermined number (1), the permission unit 14D does not permit the user to play the second content even in a case where the player character is moved to the determination area.

FIG. 15 is a flowchart illustrating an example of the first content progressing process executed by the system 100. In the first content progressing process in the example of the present embodiment, the process for progressing the first content and the process for permitting the play of the second content are performed. In FIG. 15, the process for permitting the play of the second content is mainly illustrated, and a part of the other process is not illustrated. Hereinafter, a case where the server apparatus 10D and the terminal apparatus 20 execute the progressing process will be illustratively described.

For example, the execution of the first content progressing process of the example of the present embodiment is started in a case where any terminal apparatus makes a request for participating in the first content. FIG. 15 illustrates a state (in-play) where the user of the terminal apparatus 20 is already participating in the first content.

The server apparatus 10D executes the progressing process of progressing the game (first content) based on the operation information and the like of the user received from the terminal apparatus 20 (step S10-D). For example, the process of causing the player character to execute motions such as movement and attack is performed based on the operation information of the user received together with the identification information of the user. In addition, in the progressing process, the server apparatus 10D generates the first entry event and the second entry event depending on the establishment of the generation condition. The server apparatus 10D updates the user data of the user in the participating user list of the island content depending on the result of the progressing process. For example, in a case where the user (player character) acquires an item such as the entry right or the ticket, the identification information of the item is set in the field of the possessed item of the user.

Next, the server apparatus 10D determines whether or not the current time is within any of the first predetermined period, the second predetermined period, and the third predetermined period (step S11-D). In a case where the value of the predetermined flag stored in the storage unit indicates that the current time is within the first predetermined period, the server apparatus 10D determines that the current time is within the first predetermined period. In a case where the value of the predetermined flag indicates that the current time is within the second predetermined period, the server apparatus 10D determines that the current time is within the second predetermined period. Furthermore, in a case where the value of the predetermined flag indicates that the current time is within the third predetermined period, the server apparatus 10D determines that the current time is within the third predetermined period.

In a case where the current time is not within any of the first predetermined period, the second predetermined period, and the third predetermined period (step S11-D: NO), the server apparatus 10D determines whether or not to start the first predetermined period (step S12-D). As described above, the server apparatus 10D determines to start the first predetermined period in a case where the first entry event is ended by clearing the first entry event.

In a case where the first predetermined period is started (step S12-D: YES), the server apparatus 10D executes the arrangement process (step S13-D). In the arrangement process of step S13-D, as described above, the determination areas corresponding to the number of arrangements (50) are arranged at 50 arrangement positions in the game space 55 of the first content. For example, the plurality of arrangement positions are randomly selected from any position in the game space 55. In addition, as described above, the server apparatus 10D sets the coordinates and the like of each arrangement position in the first arrangement list.

Then, the server apparatus 10D executes the starting process (step S14-D). In the starting process of step S14-D, the predetermined flag is changed to the value indicating that the current time is within the first predetermined period, and the end time of the first predetermined period is set. Then, the server apparatus 10D returns to the process of step S10-D.

In a case where the first predetermined period is not started (step S12-D: NO), the server apparatus 10D determines whether or not to start the second predetermined period (step S15-D). As described above, the server apparatus 10D determines to start the second predetermined period after the end of the first predetermined period. Specifically, in a case where the predetermined flag is set to a value indicating the end of the first predetermined period, it is determined that the second predetermined period is started.

In a case where the second predetermined period is started (step S15-D: YES), the server apparatus 10D executes the arrangement process (step S16-D). In the arrangement process of step S16-D, as described above, the server apparatus 10D refers to the first arrangement list and rearranges the blue portal 60 in which the number of permissions (permission records) does not reach the predetermined number (1) as the red portal 65 among the determination areas (blue portals 60) arranged during the first predetermined period.

Then, the server apparatus 10D executes the starting process (step S17-D). In the starting process of step S17-D, the predetermined flag is changed to the value indicating that the current time is within the second predetermined period, and the end time of the second predetermined period is set. Then, the server apparatus 10D returns to the process of step S10-D. In a case where the permission records of all blue portals 60 reach the predetermined number, the second predetermined period may be ended without arranging the red portal 65.

In a case where the second predetermined period is not started (step S15-D: NO), the server apparatus 10D determines whether or not to start the third predetermined period (step S18-D). As described above, the server apparatus 10D determines to start the third predetermined period in a case where the second entry event is ended by clearing the second entry event.

In a case where the third predetermined period is not started (step S18-D: NO), the server apparatus 10D returns to the process of step S10-D. In a case where the third predetermined period is started (step S18-D: YES), the server apparatus 10D executes the arrangement process (step S19-D). In the arrangement process of step S19-D, the server apparatus 10D arranges the determination areas (red portals 65) corresponding to the number of arrangements (8) at 8 arrangement positions in the game space of the first content. For example, the plurality of arrangement positions are randomly selected from any position in the game space. In addition, as described above, the server apparatus 10D sets the coordinates and the like of each arrangement position in the second arrangement list.

Then, the server apparatus 10D executes the starting process (step S20-D). In the starting process of step S20-D, the predetermined flag is changed to the value indicating that the current time is within the third predetermined period, and the end time of the third predetermined period is set. Then, the server apparatus 10D returns to the process of step S10-D.

Next, returning to the process of step S11-D, a case where the current time is within any of the first predetermined period, the second predetermined period, and the third predetermined period will be described. In a case where the current time is within any of the first predetermined period, the second predetermined period, and the third predetermined period (step S11-D: YES), the server apparatus 10D executes the permission process (step S21-5D).

In the permission process, during the first predetermined period, the server apparatus 10D refers to the coordinates (positional information) in the user data, the coordinates (positional information) in the first arrangement list, and the like and determines whether or not each player character is moved to the determination area (blue portal 60). In addition, the server apparatus 10D refers to the first arrangement list and determines whether or not the number of permissions (permission records) for the blue portal 60 to which the player character is moved reaches the predetermined number (1).

In a case where the predetermined number is not reached, the server apparatus 10D refers to the participating user list and determines whether or not the user of the player character moved to the blue portal 60 possesses the entry right and the ticket. In a case where each item is possessed, the user of the player character moved to the blue portal 60 is permitted to play the second content. Specifically, the server apparatus 10D moves the user data of the user permitted to play from the participating user list of the island content to the participating user list of the dungeon content B. In addition, the server apparatus 10D updates (increases by one) the permission record corresponding to the determination area in the first arrangement list.

In addition, in the permission process, during the second predetermined period, the server apparatus 10D refers to the coordinates (positional information) in the user data, the coordinates (positional information) in the first arrangement list, and the like and determines whether or not each player character is moved to the determination area (red portal 65). In addition, the server apparatus 10D refers to the first arrangement list and determines whether or not the number of permissions (permission records) for the red portal 65 to which the player character is moved reaches the predetermined number (1). In a case where the predetermined number is not reached, the server apparatus 10D refers to the participating user list and determines whether or not the user of the player character moved to the red portal 65 possesses the entry right. In a case where the item is possessed, the user of the player character moved to the red portal 65 is permitted to play the second content.

Furthermore, in the permission process, during the third predetermined period, the server apparatus 10D refers to the coordinates (positional information) in the user data, the coordinates (positional information) in the second arrangement list, and the like and determines whether or not each player character is moved to the determination area (red portal 65). In addition, the server apparatus 10D refers to the second arrangement list and determines whether or not the number of permissions (permission records) for the red portal to which the player character is moved reaches the predetermined number (1). In a case where the predetermined number is not reached, the server apparatus 10D refers to the participating user list and determines whether or not the user of the player character moved to the red portal 65 possesses the entry right. In a case where the item is possessed, the user of the player character moved to the red portal 65 is permitted to play the second content.

In the permission process, the user is not permitted to play the second content in a state where the number of permissions for each of all determination areas reaches the predetermined number (a state where the number of permissions already reaches the first defined number or a state where the number of permissions already reaches the second defined number). In addition, in the permission process, for example, a determination on which predetermined period the current time belongs may be performed by referring to the predetermined flag.

Next, the server apparatus 10D executes an update process (step S21-10D). In the update process, the server apparatus 10D refers to the first arrangement list and the second arrangement list and removes the determination area arranged at coordinates for which the number of permission records reaches the predetermined number from the game space. The removed determination area is not displayed in the image of the game space displayed on the display unit of the terminal apparatus 20.

Then, the server apparatus 10D determines whether or not any of the first predetermined period, the second predetermined period, and the third predetermined period is ended (step S22-D). Specifically, in a case where the current time is within the first predetermined period, a determination as to whether or not the first predetermined period (5 minutes) is ended is performed. In a case where the current time is within the second predetermined period, a determination as to whether or not the second predetermined period (10 minutes) is ended is performed. In a case where the current time is within the third predetermined period, a determination as to whether or not the third predetermined period (10 minutes) is ended is performed. For example, in a case where the set end time is reached, the server apparatus 10D may determine that the current predetermined period is ended.

In a case where any predetermined period is not ended (step S22-D: NO), the server apparatus 10D returns to the process of step S10-D. In a case where any predetermined period is ended (step S22-D: YES), the server apparatus 10D executes the ending process (step S23-D). In the ending process, for example, a determination as to whether or not any predetermined period is ended may be performed by referring to the predetermined flag.

In the ending process, in a case where the first predetermined period is ended, the predetermined flag is changed to a value indicating the end of the first predetermined period. By referring to the value of the predetermined flag, the start of the second predetermined period is determined in the process of step S15-D. In the ending process, in a case where the second predetermined period is ended, the predetermined flag is changed to the value indicating that the current time is not within any predetermined period. In the ending process, in a case where the third predetermined period is ended, the predetermined flag is changed to the value indicating that the current time is not within any predetermined period. Then, the server apparatus 10D returns to the process of step S10-D.

In addition, while illustration is not provided, the server apparatus 10D generates the image information for generating the images of the game space 55 and the like of the first content progressed by above each process and transmits the image information to the terminal apparatus 20. Until the end of the game (step S41: YES), the terminal apparatus 20 displays the game image based on the image information received from the server apparatus 10D on the display unit (step S40). For example, in a case where an end request is received from the user (step S41: YES), the terminal apparatus 20 ends the execution of the first content.

In addition, while illustration is not provided, in a case where the user who is permitted to play the second content occurs in the first content progressing process, the server apparatus 10D executes the second content progressing process along with the first content progressing process. The server apparatus 10D controls the motion and the like of the player character of each user in the dungeon D2. In a case where the generation condition for the second entry event is established during the execution of the second content, the server apparatus 10D sets the second entry event to be executed in the first content.

In a case where the user of the terminal apparatus 20 acquires the permission to play the second content in the middle of playing the first content, the display of the game image of the dungeon D2 is started on the display unit of the terminal apparatus 20.

Although the process illustrated in FIG. 15 is described for the terminal apparatus 20, the same process is performed for the terminal apparatus of the user of each player object in the same (common) game space in the first content. That is, for each user (player object), a determination as to whether or not the determination area is reached is performed, and the play of the second content is permitted.

As described thus far, as one aspect of the fourth embodiment, it is configured that the server apparatus 10D includes the progress control unit 11D, the object control unit 12D, the arrangement unit 13D, and the permission unit 14D.

Thus, the user who is permitted to play the second content (dungeon content B) is decided using the determination areas (the blue portals and the red portals) arranged in the game space of the first content (island content). Accordingly, the play is permitted considering the play situation and the like of the game. Thus, the user who is permitted to participate can be appropriately decided for the game content such as the second content in which the number of participating users is set.

In addition, the number of users who are permitted to play the second content is set for each determination area. Thus, even in a case where the determination area is discovered after another user (player object), the play of the second content may not be permitted, and the pleasure of finding the determination area by the user is increased.

Furthermore, even during the second predetermined period after the elapse of the first predetermined period and the third predetermined period, the determination areas are arranged, and the play of the second content is permitted. Thus, dissatisfaction of the user who cannot obtain the permission during the first predetermined period can be reduced.

In the example of the above-described embodiment, the determination areas (portals) are arranged after the first entry event is cleared. Alternatively, the determination areas may be arranged without clearing the first entry event. In addition, the determination areas may be arranged regardless of the event. In the example of the above-described embodiment, the second predetermined period is immediately started after the end of the first predetermined period. However, the embodiment is not for limitation purposes. Any timing after the elapse of the first predetermined period can be employed as the start timing of the second predetermined period.

In the example of the above-described embodiment, the determination areas (portals) are also arranged after the second entry event is cleared. Alternatively, the determination areas may be arranged without clearing the second entry event. In addition, for example, in a case where the number of users participating in the second content is greater than or equal to a predetermined number, the second entry event may not be generated. Furthermore, the second defined number may be a fixed value or a value that changes depending on a predetermined configuration. For example, in the second content, the second defined number may be the amount of decrease from the initial number of participating users. That is, in the second content, the number of users (player characters) who are participating from the start and do not participate anymore because the users are defeated may be set as the second defined number.

In the example of the above-described embodiment, the start timing and the end timing are set for the dungeon content B. Alternatively, each timing may not be set.

In the example of the above-described embodiment, in a case where the play of the second content is permitted, the first content is stopped, and the play of the second content is started without the consent of the user. However, the embodiment is not for limitation purposes. For example, after the play of the second content is permitted, the play of the second content may be started based on the participation request (operation information) for the second content from the user. In this case, for example, information of the permission to play the second content may be set in the user data.

In the example of the above-described embodiment, it is configured that the predetermined number obtained by dividing the first defined number (or the second defined number) is set for each determination area, and the user is not permitted to play the second content for the determination area in which the predetermined number is reached. However, the embodiment is not for limitation purposes. For example, the predetermined number may not be set for each determination area, and a determination as to whether or not the total value of the number of permissions reaches the first defined number may be performed.

The above-described determination area is removed and does not present anymore on the game space in a case where the predetermined number is reached. Alternatively, it may be configured that at least the display of the determination area is disabled.

APPENDIX

The descriptions of the above-described embodiments are disclosed such that those skilled in the field to which the invention belongs can embody at least the following invention.

[1] A game processing program for causing a server apparatus to control progress of a video game, the server apparatus being connected through a communication network to a terminal apparatus that executes the video game including a plurality of game contents in which one or more users can participate, the program causing the server apparatus to implement a progress control function of controlling progress of the plurality of game contents including a first content and a second content, an object control function of controlling motion of a player object of each user in game spaces of the game contents, an arrangement function of arranging determination areas at a plurality of arrangement positions in a game space of the first content during a first predetermined period, and a permission function of permitting users of player objects moved to the determination areas to play the second content until the number of permissions reaches a first defined number.

[2] The game processing program according to [1], in which a predetermined number that is obtained by dividing the first defined number is set for each of the determination areas, and in the permission function, a function of not permitting the user to play the second content in the determination area in which the number of permissions reaches the predetermined number is implemented.

[3] The game processing program according to [2], in which in the arrangement function, a function of arranging the determination areas at the plurality of arrangement positions in the game space of the first content during the first predetermined period and arranging a determination area in which the number of permissions does not reach the predetermined number among the determination areas during a second predetermined period after an elapse of the first predetermined period is implemented, and in the permission function, a function of permitting a user establishing a predetermined condition to play the second content among the users of the player objects moved to the determination areas during the first predetermined period, and a function of permitting users of player objects moved to the determination areas to play the second content during the second predetermined period are implemented.

[4] The game processing program according to [2] or [3], in which in the arrangement function, a function of removing or disabling a display of the determination area in which the predetermined number is reached is implemented.

[5] The game processing program according to any one of [1] to [4], in which in the progress control function, progress control of the second content is started after the start of the first predetermined period, and in the permission function, a function of moving the player objects of the permitted users to a game space of the second content from the game space of the first content is implemented.

[6] The game processing program according to any one of [1] to [5], in which in the progress control function, a function of generating a first event in the first content is implemented, and in the arrangement function, a function of arranging the determination areas by starting the first predetermined period in a case where a task of the first event is accomplished is implemented.

[7] The game processing program according to any one of [1] to [6], in which in the arrangement function, a function of generating a second event in the first content in the middle of progress of the second content is implemented, in the arrangement function, a function of arranging the determination areas at the plurality of arrangement positions in the game space of the first content by starting a third predetermined period in a case where a task of the second event is accomplished is implemented, and in the permission function, a permission function of permitting the users of the player objects moved to the determination areas to play the second content until a second defined number lower than the first defined number is reached during the third predetermined period is implemented.

[8] The game processing program according to any one of [1] to [7], in which in the arrangement function, a function of randomly deciding the plurality of arrangement positions is implemented.

[9] The game processing program according to any one of [1] to [8], in which in the arrangement function, a function of arranging predetermined objects as the determination areas is implemented.

[10] The game processing program according to [3], in which the predetermined condition is possession of a predetermined item.

[11] A video game processing program for causing the terminal apparatus to implement at least one of the functions implemented in the server apparatus by the video game processing program according to any one of [1] to [11].

[12] A server apparatus on which the game processing program according to any one of [1] to [10] is installed.

[13] A game system that controls progress of a video game, the system including a terminal apparatus that executes the video game including a plurality of game contents in which one or more users participate, and a server apparatus that is connected through a communication network to the terminal apparatus, in which the server apparatus includes a progress controller configured to control progress of the plurality of game contents including a first content and a second content, an object controller configured to control motion of a player object of each user in game spaces of the game contents, an arranger configured to arrange determination areas at a plurality of arrangement positions in a game space of the first content during a first predetermined period, and a permitter configured to permit users of player objects moved to the determination areas to play the second content until the number of permissions reaches a first defined number.

[14] A game processing program for causing a computer of a terminal apparatus of a user to implement a function of communicating with a server apparatus having a function of controlling progress of a video game including a plurality of game contents in which one or more users participate, the program causing the terminal apparatus to implement a function of receiving image information from the server apparatus having a progress control function of controlling progress of the plurality of game contents including a first content and a second content, an object control function of controlling motion of a player object of each user in game spaces of the game contents, an arrangement function of arranging determination areas at a plurality of arrangement positions in a game space of the first content during a first predetermined period, a permission function of permitting users of player objects moved to the determination areas to play the second content until the number of permissions reaches a first defined number, and a generation function of generating the image information of the game contents.

[15] A terminal apparatus on which the video game processing program according to [14] is installed.

[16] A game processing method of controlling progress of a video game by a terminal apparatus that executes the video game including a plurality of game contents in which one or more users participate, and a server apparatus that is connected through a communication network to the terminal apparatus, the method including a progress control process of controlling progress of the plurality of game contents including a first content and a second content, an object control process of controlling motion of a player object of each user in game spaces of the game contents, an arrangement process of arranging determination areas at a plurality of arrangement positions in a game space of the first content during a first predetermined period, and a permission process of permitting users of player objects moved to the determination area to play the second content until the number of permissions reaches a first defined number.

One embodiment of the present invention is useful for appropriately deciding the user who is permitted to participate in the game content in which the number of participating users is set.

What is claimed is:

1. A non-transitory recording medium storing a game processing program for causing a server apparatus to control progress of a video game, the server apparatus being connected through a communication network to a terminal apparatus that executes the video game including a plurality of game contents in which one or more users participate, the program causing the server apparatus to implement, upon execution:

a progress control function of controlling progress of the plurality of game contents including a first content and a second content;

an object control function of controlling motion of a player object of each user in game spaces of the game contents;

an arrangement function of arranging determination areas at a plurality of arrangement positions in a game space of the first content during a first predetermined period; and a permission function of permitting users of player objects moved to the determination areas to play the second content until a number of permissions reaches a first defined number, wherein in the arrangement function, a function of generating an event in the first content in middle of progress of the second content is implemented, in the arrangement function, a function of arranging the determination areas at the plurality of arrangement positions in the game space of the first content by starting a second predetermined period in a case where a task of the event is accomplished is implemented, and in the permission function, a permission function of permitting the users of the player objects moved to the determination areas to play the second content until a second defined number lower than the first defined number is reached during the second predetermined period is implemented.

2. The non-transitory recording medium storing the game processing program according to claim 1,
wherein a predetermined number that is obtained by dividing the first defined number is set for each of the determination areas, and
in the permission function, a function of not permitting the user to play the second content in a determination area in which the number of permissions reaches the predetermined number is implemented.

3. The non-transitory recording medium storing the game processing program according to claim 2,
wherein in the arrangement function, a function of arranging the determination areas at the plurality of arrangement positions in the game space of the first content during the first predetermined period and arranging a determination area in which the number of permissions does not reach the predetermined number among the determination areas during a third predetermined period after an elapse of the first predetermined period is implemented, and
in the permission function, a function of permitting a user establishing a predetermined condition to play the second content among the users of the player objects moved to the determination areas during the first predetermined period, and a function of permitting users of player objects moved to the determination areas to play the second content during the third predetermined period are implemented.

4. The non-transitory recording medium storing the game processing program according to claim 2,
wherein in the arrangement function, a function of removing or disabling a display of the determination area in which the predetermined number is reached is implemented.

5. The non-transitory recording medium storing the game processing program according to claim 1,
wherein in the progress control function, progress control of the second content is started after a start of the first predetermined period, and
in the permission function, a function of moving the player objects of the permitted users to a game space of the second content from the game space of the first content is implemented.

6. The non-transitory recording medium storing the game processing program according to claim 1,
wherein in the progress control function, a function of generating another a first event in the first content is implemented, and
in the arrangement function, a function of arranging the determination areas by starting the first predetermined period in a case where a task of the other event is accomplished is implemented.

7. The non-transitory recording medium storing the game processing program according to claim 1,
wherein in the arrangement function, a function of randomly deciding the plurality of arrangement positions is implemented.

8. The non-transitory recording medium storing the game processing program according to claim 1,
wherein in the arrangement function, a function of arranging predetermined objects as the determination areas is implemented.

9. The non-transitory recording medium storing the game processing program according to claim 3,
wherein the predetermined condition is possession of a predetermined item.

10. A game system that controls progress of a video game, the system comprising:
a terminal apparatus that executes the video game including a plurality of game contents in which one or more users participate; and
a server apparatus that is connected through a communication network to the terminal apparatus,
wherein the server apparatus includes
a progress controller configured to control progress of the plurality of game contents including a first content and a second content,
an object controller configured to control motion of a player object of each user in game spaces of the game contents,
an arranger configured to arrange determination areas at a plurality of arrangement positions in a game space of the first content during a first predetermined period, and
a permitter configured to permit users of player objects moved to the determination areas to play the second content until a number of permissions reaches a first defined number,
wherein the arranger generates an event in the first content in middle of progress of the second content,
the arranger arranges the determination areas at the plurality of arrangement positions in the game space of the first content by starting a second predetermined period in a case where a task of the event is accomplished, and
the permitter permits the users of the player objects moved to the determination areas to play the second content until a second defined number lower than the first defined number is reached during the second predetermined period.

11. A non-transitory recording medium storing a game processing program for causing a computer of a terminal apparatus of a user to implement a function of communicating with a server apparatus having a function of controlling progress of a video game including a plurality of game contents in which one or more users participate, the program causing the terminal apparatus to implement, upon execution:
a function of receiving image information from the server apparatus having a progress control function of controlling progress of the plurality of game contents including a first content and a second content, an object control function of controlling motion of a player object of each user in game spaces of the game contents, an arrangement function of arranging determination areas at a plurality of arrangement positions in a game space of the first content during a first predetermined period, a permission function of permitting users of player objects moved to the determination areas to play the second content until a number of permissions reaches a first defined number, and a generation function of generating the image information of the game contents,
wherein in the arrangement function, a function of generating an event in the first content in middle of progress of the second content is implemented,
in the arrangement function, a function of arranging the determination areas at the plurality of arrangement positions in the game space of the first content by starting a second predetermined period in a case where a task of the event is accomplished is implemented, and in the permission function, a permission function of permitting the users of the player objects moved to the determination areas to play the second content until a second defined number lower than the first defined number is reached during the second predetermined period is implemented.

\* \* \* \* \*

UNITED STATES PATENT AND TRADEMARK OFFICE
CERTIFICATE OF CORRECTION

PATENT NO. : 11,045,729 B2
APPLICATION NO. : 16/703129
DATED : June 29, 2021
INVENTOR(S) : N. Yoshida et al.

It is certified that error appears in the above-identified patent and that said Letters Patent is hereby corrected as shown below:

In the Claims

At Column 33, Line 50 (Claim 6, Line 4), please change "another a first event" to -- another event --.

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*